(12) United States Patent
Aleem et al.

(10) Patent No.: US 11,093,034 B2
(45) Date of Patent: Aug. 17, 2021

(54) EYE TRACKING METHOD AND SYSTEM AND INTEGRATION OF THE SAME WITH WEARABLE HEADS-UP DISPLAYS

(71) Applicant: GOOGLE LLC, Mountain View, CA (US)

(72) Inventors: Idris S. Aleem, Kitchener (CA); Mayank Bhargava, Waterloo (CA); Andrew S. Logan, Waterloo (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/668,677

(22) Filed: Oct. 30, 2019

(65) Prior Publication Data

US 2020/0142479 A1    May 7, 2020

Related U.S. Application Data

(60) Provisional application No. 62/754,307, filed on Nov. 1, 2018.

(51) Int. Cl.
*G06F 3/01* (2006.01)
*G06T 7/73* (2017.01)
*G02B 27/00* (2006.01)

(52) U.S. Cl.
CPC ......... *G06F 3/013* (2013.01); *G02B 27/0093* (2013.01); *G06T 7/73* (2017.01); *G06T 2207/10048* (2013.01); *G06T 2207/30201* (2013.01)

(58) Field of Classification Search
CPC ........ G06F 3/013; G06T 7/73; G02B 27/0093
See application file for complete search history.

(56) References Cited

U.S. PATENT DOCUMENTS

| | | | |
|---|---|---|---|
| 9,552,061 B2 * | 1/2017 | Zhang | G06T 7/85 |
| 9,989,764 B2 * | 6/2018 | Alexander | G06F 1/163 |
| 10,078,219 B2 * | 9/2018 | Alexander | G02B 5/32 |
| 10,133,075 B2 * | 11/2018 | Bailey | G02B 27/017 |
| 10,613,331 B2 * | 4/2020 | Moore | G02B 26/10 |
| 10,698,481 B1 * | 6/2020 | Najafi Shoushtari | G06T 19/006 |
| 2004/0174496 A1 * | 9/2004 | Ji | G06F 3/013 351/209 |
| 2016/0033771 A1 * | 2/2016 | Tremblay | G02B 26/10 345/8 |
| 2016/0209657 A1 * | 7/2016 | Popovich | A61B 3/113 |
| 2017/0285741 A1 * | 10/2017 | Park | G06K 9/00617 |

\* cited by examiner

*Primary Examiner* — Sardis F Azongha

(57) ABSTRACT

A method of tracking a gaze position of an eye in a target space in a field of view of the eye over an eye tracking period includes performing a plurality of scans of the eye with infrared light within the eye tracking period. Each scan includes generating infrared light signals over a scan period and projecting the infrared light signals from a plurality of virtual light projectors to the eye to form a plurality of illumination areas on the eye. Reflections of the infrared light signals from the eye are detected for each scan. The gaze position of the eye in the target space is determined from the detected reflections of the infrared light signals for each scan.

23 Claims, 13 Drawing Sheets

EYE TRACKING METHOD AND SYSTEM AND INTEGRATION OF THE SAME WITH WEARABLE HEADS-UP DISPLAYS

CROSS-REFERENCE TO RELATED APPLICATIONS

This application claims the benefit of U.S. Provisional Application No. 62/754,307, filed 1 Nov. 2018, titled "Eye Tracking Method and System and Integration of the Same with Wearable Heads-Up Displays", the content of which is incorporated herein in its entirety by reference.

TECHNICAL FIELD

The disclosure relates to methods and systems for tracking a gaze position of an eye in a target space, such as a display space formed by a wearable heads-up display.

BACKGROUND

Eye tracking is a process by which one or more of a position, orientation, and motion of an eye may be measured or monitored. In many applications, this is done with a view towards determining the gaze direction of a user. There are various eye tracking techniques, the least invasive of which employs one or more optical sensors, e.g., cameras, to optically track the eye. Common techniques involve illuminating or flooding the eye with infrared light and measuring reflections from the eye with at least one optical sensor that is tuned to be sensitive to the infrared light. Reflections of infrared light from the eye are analyzed to determine the position, orientation, and/or motion of one or more eye features, such as the cornea, pupil, iris, and/or retinal blood vessels.

Eye tracking may be implemented in near-eye or head-mounted devices that have a structure to deliver light to the eye. One example of such near-eye or head-mounted devices is a wearable heads-up display that can be worn on the head like conventional glasses. In wearable heads-up displays, eye tracking can enable a variety of functionalities, such as influencing where content is displayed in the field of view of the user, conserving power by not displaying content that is outside of the field of view of the user, influencing what content is displayed to the user, determining where the user is looking or gazing, determining whether the user is looking at displayed content on the display or at scenes in the external environment, and providing an interface through which the user may control or interact with displayed content.

Eye tracking functionality if incorporated into a wearable heads-up display will need to be robust enough to accommodate movements of the wearable heads-up display and/or head of the user wearing the wearable heads-up display. Without the necessary robustness, movements of the wearable heads-up display and/or head of the user during eye tracking can lead to errors or inconsistencies in the gaze positions obtained from eye tracking. Some eye tracking systems use multiple cameras and some method of fusing the data from the multiple cameras to improve robustness of eye tracking. However, there are challenges with incorporating multiple cameras into a wearable heads-up display due to space constraints in the wearable heads-up display and/or other design requirements of the wearable heads-up display.

SUMMARY

In a first aspect, a method of tracking a gaze position of an eye in a target space in a field of view of the eye over an eye tracking period may be summarized as including performing a plurality of scans of the eye with infrared light within the eye tracking period; detecting reflections of the infrared light from the eye for each scan; and determining the gaze position of the eye in the target space from the detected reflections of the infrared light signals for each scan, where each scan includes generating infrared light over a scan period and projecting the infrared light signals from a number M>1 of virtual light projectors to the eye to form the number M of illumination areas on the eye.

The method according to the first aspect may further include one or more of the features described in A1 to A18 below.

A1: Projecting the infrared light signals from the number M of virtual light projectors to the eye to form the number M of illumination areas on the eye includes directing the infrared light signals from a source of the infrared light signals to an optical scanner over the scan period while controlling the optical scanner through a range of scan positions to deflect each infrared light signal at a respective scan angle.

A2: Projecting the infrared light signals from the number M of virtual light projectors to the eye as described in A1 further includes receiving each infrared light signal deflected by the optical scanner at one of the number M of optical elements of an optical splitter, and where during at least a portion of the scan period each of the number M of optical elements receives a subset of the infrared light signals and redirects each subset of the infrared light signals in a respective direction.

A3: Projecting the infrared light signals from the number M of virtual light projectors to the eye as described in A2 further includes receiving each subset of the infrared light signals redirected by each of the number M of optical elements at an optical combiner and redirecting each subset of the infrared light signals by the optical combiner to the eye, thereby forming the respective illumination area.

A4: An optical function is applied to at least a portion of the infrared light signals redirected by at least one of the number M of optical elements and received by the optical combiner. Applying an optical function to at least a portion of infrared light signals may include applying a beam diverging function to the at least a portion of the infrared light signals. Alternatively, applying an optical function to at least a portion of the infrared light signals may include applying a beam converging function to the at least a portion of the infrared light signals.

A5: Determining the gaze position of the eye in the target space from the detected reflections of the infrared light signals for each scan includes (i) identifying a plurality of glints from the detected reflections of the infrared light signals for the scan, each glint having a glint center position in a scan space, (ii) determining the glint center position in the scan space for each of the plurality of glints, and (iii) determining the gaze position relative to the target space based on the glint center positions.

A6: Determining the gaze position relative to the target space based on the glint center positions as described in A5 includes (i) applying a mapping function that transforms coordinates from the scan space to the target space to each of the glint center positions to obtain a corresponding intermediate gaze position in the target space, and (ii) combining the intermediate gaze positions to obtain the gaze position in the target space for the scan.

A7: At a select recalibration time during the eye tracking period, the mapping function of A6 is adjusted to compensate for drifts in the scan space relative to the target space.

A8: Adjusting the mapping function to compensate for drifts in the scan space relative to the target space as described in A7 includes (i) identifying at least one pupil from the reflections of infrared light signals detected for a recent scan relative to the select recalibration time, (ii) determining a pupil center position for the at least one pupil in the scan space, (iii) identifying at least one glint from the reflections of infrared light signals detected for recent scan, the at least one glint corresponding in space to the at least one pupil, (iv) determining a glint center position for the at least one glint in the scan space, (v) determining a glint-pupil vector from the at least one glint center position and the at least one glint center position, (vi) determining a calibrating gaze position in the target space based on the glint-pupil vector, and (vii) adjusting the mapping function based on the calibrating gaze position.

A9: Identifying at least one pupil from the reflections of infrared light signals detected for a recent scan relative to the select recalibration time as described in A8 includes constructing at least one image of the eye from the detected reflections of infrared light signals and detecting the at least one pupil in the at least one image of the eye.

A10: Adjusting the mapping function based on the calibrating gaze position as described in A8 includes applying an offset to the mapping function, the offset selected such that an adjusted gaze position in the target space obtained from the mapping function and offset is consistent with the calibrating gaze position obtained in the target space.

A11: Determining the gaze position of the eye in the target space from the detected reflections of the infrared light signals for each scan includes (i) identifying a plurality of glints from the detected reflections of the infrared light signals for the scan, each glint associated with one of a plurality of scan subspaces, (ii) determining a glint center position of each glint in a respective scan subspace, and (iii) determining the gaze position relative to the target space based on the glint center positions.

A12: Determining the gaze position relative to the target space based on the glint center positions as described in A11 includes (i) applying mapping functions to the glint center positions to obtain corresponding intermediate gaze positions in the target space, where each of the mapping functions transforms coordinates from one of the scan subspaces to the target space, and (ii) combining the intermediate gaze positions to obtain the gaze position in the target space for the scan.

A13: At a select recalibration time during the eye tracking period, adjusting each of the mapping functions of A12 to compensate for drift in the respective scan subspace relative to the target space.

A14: Adjusting each of the mapping functions to compensate for drift in the respective scan subspace relative to the target space as described in A13 includes (i) from a recent scan relative to the select recalibration time, identifying a plurality of pupils from the reflections of infrared light signals detected for the recent scan, each of the pupils associated with one of the plurality of scan subspaces, (ii) determining a pupil center position for each of the pupils in a respective one of the scan subspaces, (iii) identifying a plurality of glints from the reflections of infrared light signals detected for the recent scan, each of the plurality of glints corresponding in scan subspace to one of the plurality of pupils, (iv) determining a glint center position for each of the glints in the respective scan subspace, (v) determining a glint-pupil vector from each set of pupil center position and glint center position in the same scan subspace, (vi) for each glint-pupil vector, determining a calibrating gaze position in the target space, and (vii) adjusting each of the mapping functions based on the respective calibrating gaze position.

A15: Identifying a plurality of pupils from the reflections of infrared light signals detected for the recent scan as described in A14 includes constructing a plurality of images of the eye from the detected reflections of infrared light signals and detecting the pupils from the images of the eye.

A16: Adjusting each of the mapping functions based on the respective calibrating gaze position as described in A14 includes applying an offset to the mapping function, the offset selected such that an adjusted gaze position in the target space obtained from the mapping function and offset is consistent with the respective calibrating gaze position obtained in the target space.

A17: Determining the gaze position of the eye in the target space from the detected reflections of the infrared light signals for each scan includes identifying a plurality of glints from the detected reflections of the infrared light signals for the scan. Upon identifying each glint, a glint center position of the glint relative to a scan space or a scan subspace is determined and the glint center position is transformed from the scan space or the scan subspace to the gaze position in the target space.

A18: Detecting reflections of the infrared light signals from the eye for each scan may include detecting reflections of each infrared light signal along at least two different paths.

In a second aspect, a method of displaying content to an eye in a target space in a field of view of the eye may be summarized as including projecting visible light to at least one exit pupil formed proximate the eye to form a virtual display in the target space over a first period and tracking a gaze position of the eye in the target space over a second period overlapping with the first period. Tracking a gaze position of the eye in the target space may include performing a plurality of scans of the eye with infrared light over the second period. Each scan may include generating infrared light signals over a scan period and projecting the infrared light signals from a number M>1 of virtual light projectors to the eye to form M illumination areas on the eye. Tracking the gaze position of the eye in the target space may further include detecting reflections of the infrared light signals from the eye for each scan and determining the gaze position of the eye in the target space from the detected reflections of the infrared light signals for each scan. The method further includes selectively adjusting the virtual display in the target space based on the gaze position.

The method according to the second aspect may further include one or more of the features described in B1 to B2 below.

B1: A trajectory of the gaze position of the eye from the detected reflections of the infrared light signals for each scan is determined.

B2: A plurality of exit pupils are formed proximate the eye, and the exit pupils are selectively enabled to receive, or disabled to not receive, a portion of the visible light based on the trajectory of the gaze position as described in B 1.

In a third aspect, an eye tracking system may be summarized as including a scanning light projector including an infrared light source and at least one scan mirror, the scanning light projector to output infrared light signals according to a scan pattern; an optical splitter having a number M>1 of optical elements, each of the number M of optical elements to receive a subset of the infrared light signals outputted by the scanning light projector and create a virtual light projector for the subset of the infrared light signals; an optical combiner positioned and oriented to receive each subset of the infrared light signals from the corresponding virtual light projector and redirect the subset of the infrared light signals to a target to form an illumination area on the target, the optical combiner including at least one infrared hologram that is responsive to infrared light and unresponsive to other light; and an infrared detector positioned and oriented to detect reflections of the infrared light signals redirected to the target area.

The eye tracking system according to the third aspect may further include one or more of the features described in C1 to C2 below.

C1: A second infrared hologram is positioned between the optical splitter and the optical combiner to apply a select optical function to at least a fraction of the infrared light signals outputted by the optical splitter. The second infrared hologram may have characteristics to apply a beam diverging function to the at least a fraction of the infrared light signals outputted by the optical splitter. Alternatively, the second infrared hologram may have characteristics to apply a beam converging function to the at least a fraction of the infrared light signals outputted by the optical splitter.

C2: A processor is communicatively coupled to the scanning light projector and the infrared detector and a non-transitory processor-readable storage medium that is communicatively coupled to the processor. The non-transitory processor-readable storage medium stores data and/or processor-executable instructions that, when executed by the processor, cause the eye tracking system to: generate infrared light signals by the infrared light source over a scan period; project the infrared light signals from the number M of virtual light projectors created by the optical splitter to the eye to form M illumination areas on the eye; detect reflections of the infrared light signals from the eye by the infrared detector for the scan period; and determine the gaze position of the eye in the target space from the detected reflections of the infrared light signals for the scan period.

In a fourth aspect, a wearable heads-up display may be summarized as including a support frame; a first scanning light projector including an infrared light source and at least one first scan mirror, the first scanning light projector to output infrared light signals according to a first scan pattern; a first optical splitter having a number M>1 of optical elements, each of the number M of optical elements to receive a subset of the infrared light signals outputted by the first scanning light projector and create a virtual light projector for the subset of the infrared light signals; a first optical combiner positioned and oriented to receive each subset of the infrared light signals from the corresponding virtual light projector and redirect the subset of the infrared light signals to a target to form an illumination area on the target, the first optical combiner including at least one infrared hologram that is responsive to infrared light and unresponsive to visible light; a second scanning light projector including a plurality of visible light sources and at least one second scan mirror, the second scanning light projector to output visible light signals according to a second scan pattern; a second optical splitter having a number N>1 of optical elements, each of the number N of optical elements to receive a subset of the visible light signals outputted by the second scanning light projector and create a virtual light projector for the subset of the visible light signals; a second optical combiner positioned and oriented to receive each subset of the visible light signals from the corresponding virtual light projector and redirect the subset of the visible light signals to the number N of exit pupils proximate the target, the second optical combiner including at least one visible hologram that is responsive to visible light and unresponsive to infrared light; and an infrared detector coupled to the support frame to detect reflections of the infrared light signals from the target.

In a fifth aspect, A wearable heads-up display may be summarized as including a support frame; a scanning light projector including an infrared light source, a plurality of visible light sources, and at least one first scan mirror, the scanning light projector to output infrared light signals and visible light signals; an optical splitter having a number M>1 of optical elements, each of the number M of optical elements to receive a subset of the infrared light signals and a subset of the visible light signals outputted by the scanning light projector and create a virtual light projector for the subset of the infrared light signals and the subset visible light signals; an optical combiner lens positioned and oriented to receive each subset of the infrared light signals and each subset of the visible light signals, the optical combiner lens comprising a first optical combiner to redirect each subset of the infrared light signals to form one of the number M of illumination areas on a target and a second optical combiner to redirect each subset of the visible light signals to one of the number M of exit pupils proximate the target; and an infrared detector coupled to the support frame to detect reflections of the infrared light signals from the target.

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
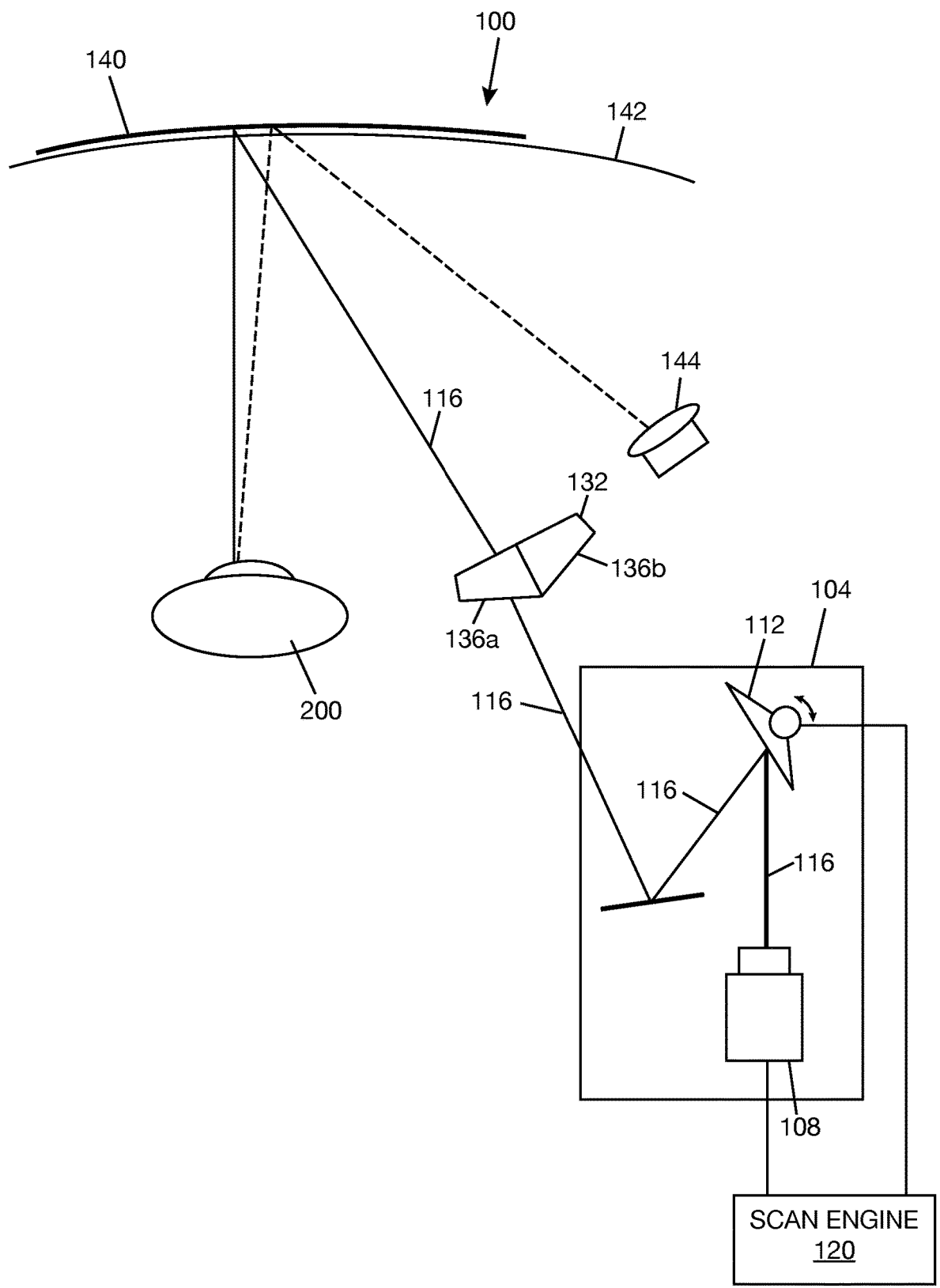
FIG. 1 is a schematic diagram of an eye tracking system.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, throughout the specification and claims which follow, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the embodiments.

FIG. 1 shows an eye tracking system 100 according to one illustrative implementation. Eye tracking system 100 includes a scanning light projector 104 that is operable to draw a scan pattern over at least a portion of eye 200 using infrared light. The length of time over which the scan pattern is drawn may be referred to as "scan period". The length of time over which a gaze position of eye 200 is tracked may be referred to as "eye tracking period". An eye tracking period may include one or more scan periods. Scanning light projector 104 includes an infrared light source 108 and an optical scanner 112. In one example, infrared light source 108 includes at least one infrared laser diode. In one example, optical scanner 112 includes at least one scan mirror. In one example, the at least one scan mirror may be a biaxial mirror. In another example, the at least one scan mirror may be two monoaxial mirrors—the mirrors may be arranged such that the axes of the mirrors are orthogonal to each other. The scan mirror(s) of optical scanner 112 may be microelectromechanical systems (MEMS) mirror(s), piezoelectric mirror(s), and the like. In other examples, optical scanner 112 may be a mirrorless optical scanner or may include a combination of mirror and mirrorless optical scanning elements.

Scanning light projector 104 outputs infrared light signals according to the scan pattern to be drawn on eye 200. In particular, infrared light source 108 generates infrared light signals 116, and optical scanner 112 receives each infrared light signal 116 from infrared light source 108 and deflects the infrared light signal 116 at a scan angle dictated by the scan position of the optical scanner, e.g., an angle correlated to the angular position of the scan mirror(s) in the optical scanner. The term "light signal" is intended to refer to a particular instance of light generated by infrared light source 108. If infrared light source 108 is running continuously, a light signal will be light generated at some time t of the period that the infrared light source is on. If infrared light source 108 is turned on selectively, e.g., in coordination with the scan position of optical scanner 112, then the light signal will be light generated when the infrared light source is turned on.

A projection path from scanning light projector 104 to eye 200 includes an optical splitter 132 and an optical combiner 140. Optical splitter 132 creates M spatially-separated virtual light projectors. Each virtual light projector projects a subset of the infrared light signals 116 from scanning light projector 104 to optical combiner 140. Optical combiner 140 is oriented to receive each subset of infrared light signals from each virtual light projector created by optical splitter 132 and to redirect each subset of infrared light signals to eye 200, thereby creating a corresponding illumination area on eye 200. M virtual light projectors will result in M illumination areas on eye 200. In much of this disclosure, M=4 is used as an example. However, it should be understood that the general conditions for M are that M is an integer and M>1. M also has the same value regardless of the component or feature of the eye tracking system to which it is applied.

Figure 2:
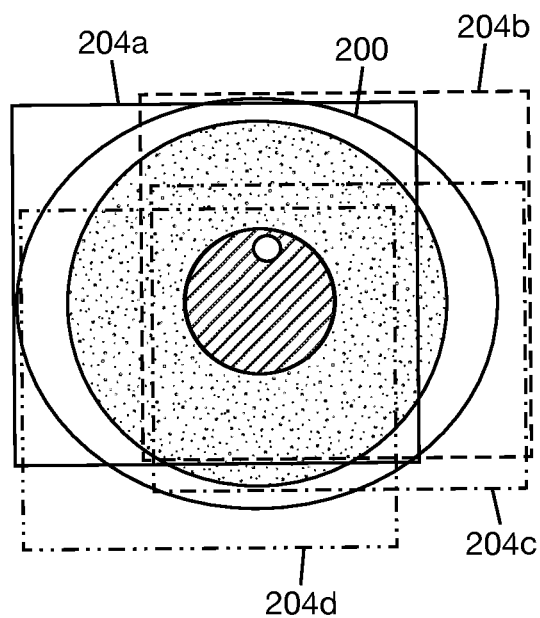
FIG. 2 is a schematic diagram of an eye and illumination areas projected onto the eye.

For illustration purposes, FIG. 2 shows M illumination areas, e.g., 204a, 204b, 204c, 204d, formed on eye 200. Each of illumination areas 204a, 204b, 204c, 204d represents an area on eye 200 in which a portion of the scan pattern is drawn. The boundaries of illumination areas 204a, 204b, 204c, 204d are shifted relative to each other on eye 200 due to the different optical paths taken by the subsets of infrared light signals from the scanning light projector (104 in FIG. 1) to illumination areas 204a, 204b, 204c, 204d. The illumination areas 204a, 204b, 204c, 204d also overlap. In general, eye 200 is scanned multiple times in those portions where any two or more of the illumination areas 204a, 204b, 204c, 204d overlap. The arrangement and extents of the M illumination areas may be selected such that the M illumination areas all overlap in a region of interest of eye 200, which would correspond to M sub-scans of that region of the eye. The arrangement and extents of the M illumination areas may be influenced by the design and arrangement of the optics in the projection path from the scanning light projector (104 in FIG. 1) to eye 200.

Figure 3A:
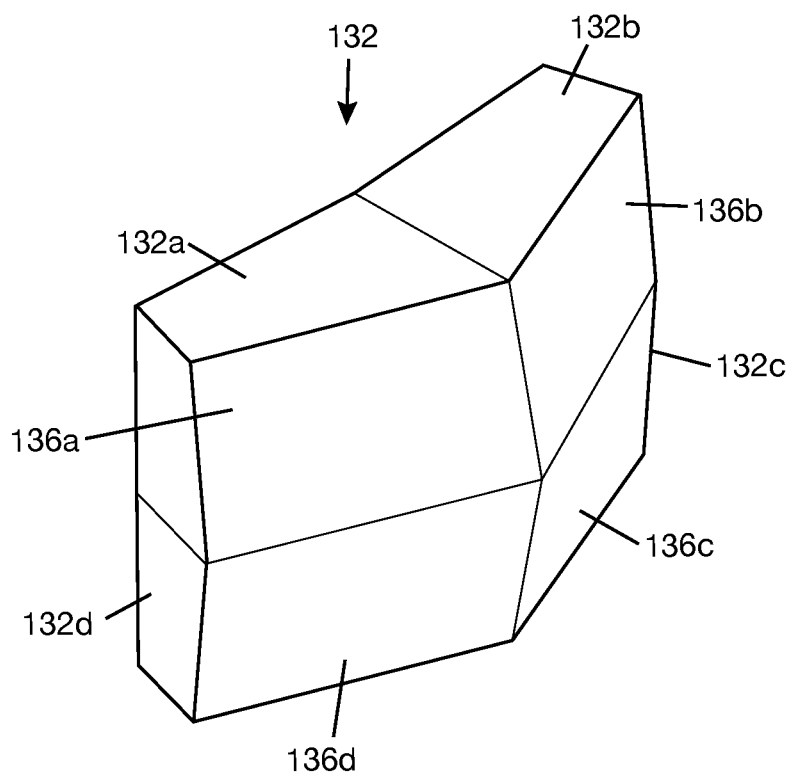
FIG. 3A is an isometric view of an optical splitter.

In one implementation, as illustrated in FIG. 3A, optical splitter 132 is a compound prism made of M optical elements, e.g., optical elements 132a, 132b, 132c, 132d. Optical elements 132a, 132b, 132c, 132d do not have to be identical in shape and size. Optical elements 132a, 132b, 132c, 132d are arranged to provide M facets, e.g., facets 136a, 136b, 136c, 136d, respectively, at a side of optical splitter 132, which may be the input side or the output side of the optical splitter. Each of facets 136a, 136b, 136c, 136d may be flat surfaces or may include surface modifications to provide optical functions, such as field flattening, aberration correction, and the like. In the example of FIG. 3A, facets 136a, 136b, 136c, 136d are contiguous. Optical elements 132a, 132b, 132c, 132d may be discrete elements that are joined together, e.g., by optical adhesive or the like, or optical splitter 132 may be formed as a monolithic body with M portions of the monolithic body providing the M optical elements. Each of optical elements 132a, 132b, 132c, 132d is made of a material that is at least transparent to infrared light. Each of optical elements 132a, 132b, 132c, 132d having a facet at a side of the optical splitter 132 defines a virtual light projector.

Returning to FIG. 1, optical splitter 132 is positioned and oriented relative to scanning light projector 104 such that each of the M facets of optical splitter 132 (136a, 136b, 136c, 136d in FIG. 3A) receives a subset of the infrared light signals projected by scanning light projector 104 during each scan period. In the example shown in FIG. 1, the M facets, e.g., 136a, 136b, 136c, 136d in FIG. 3A, are on the input side of optical splitter 132. However, it is possible to orient optical splitter 132 such that the M facets are on the output side of optical splitter 132 without disturbing the ability of optical splitter 132 to create the M virtual light projectors.

In one implementation, glint and pupil are used for robust eye tracking. For glint detection, the light projected to eye 200 could be focused because glint is relatively small and does not tend to move around as much as a function of gaze. For pupil detection, a much larger area of eye 200 needs to be illuminated to reliably image the whole pupil for all gaze directions. An optical function may be applied to at least a portion of the light coming out of the optical splitter 132 to enhance glint detection and/or pupil detection. In one example, a beam converging function may be applied to at least a portion of the light coming out of the optical splitter 132 to focus the light signals forming at least one of the illumination areas (204a, 204b, 204c, 204d in FIG. 2) on eye 200—this is useful for glint detection. In another example, a beam diverging function may be applied to at least a portion of the light coming out of the optical splitter 132 to expand the light signals forming at least one of the illumination areas (204a, 204b, 204c, 204d in FIG. 2) on eye 200—this is useful for pupil detection. The expansion may be sufficient to cover the whole eye or a larger area of the eye including the whole pupil.

Figure 3B:
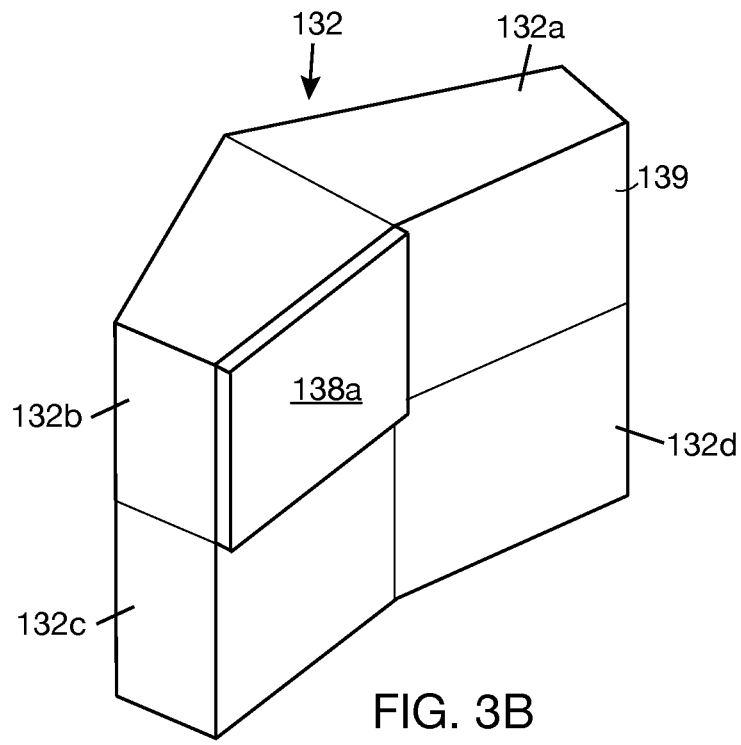
FIG. 3B is an isometric view of an optical splitter including an infrared hologram with an optical function.
Figure 3C:
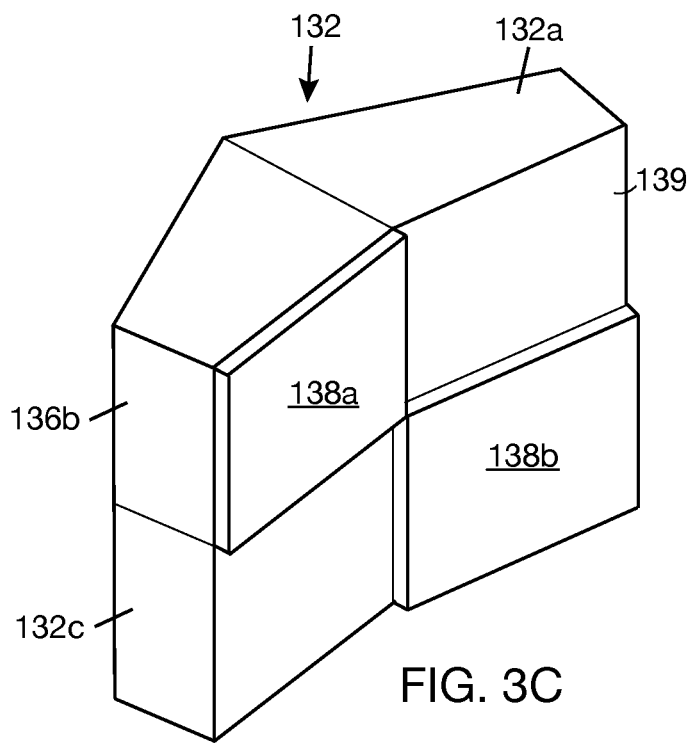
FIG. 3C is an isometric view of an optical splitter including two infrared holograms with optical functions.

In one example, an optical function may be applied to light coming out of optical splitter 132 by placing at least one infrared hologram that is recorded with an appropriate optical function on the output end of the optical splitter 132, or in an optical path between the optical splitter 132 and the optical combiner 140. In one example, the infrared hologram is a transmission hologram that allows infrared light to pass through while applying the optical function to the infrared light. For illustrative purposes, FIG. 3B shows infrared hologram 138a applied to a portion of an output side 139 of optical splitter 132 corresponding to optical element 136b. In this case, the optical function provided by hologram 138a will affect only a fraction of the infrared light signals coming out of optical splitter 132, i.e., the subset of infrared light signals coming out of optical element 136b, and passing through hologram 138a. FIG. 3C shows another infrared hologram 138b applied to another portion of the output side 139 of optical splitter 132. Infrared holograms 138a, 138b could apply the same optical function or different optical functions to subsets of the light coming out of optical splitter 132, where in one example the optical function(s) may be selected from beam converging and diverging functions. In another example not shown, an infrared hologram with an optical function may be applied to the entire output side 139, or an infrared hologram with an optical function may be applied to each of the optical elements, where in one example the optical function(s) may be selected from beam converging and diverging functions.

Returning to FIG. 1, optical combiner 140 may be integrated into a lens 142, such as an eyeglass. Optical combiner 140 may be a holographic optical element incorporating one or more infrared holograms that are responsive to infrared light and unresponsive to other light, e.g., visible light. Each of the infrared holograms in optical combiner 140 may be a redirecting hologram. In this case, "responsive to infrared light" means that the infrared hologram redirects at least a portion of the infrared light, where the magnitude of the portion depends on the playback efficiency of the infrared hologram. Unresponsive to other light means that the infrared hologram transmits the other light, generally without modifying the other light. The infrared hologram(s) may be designed to be responsive to a particular infrared wavelength range to be outputted by scanning light projector 104. In one example, optical combiner 140 includes a single infrared hologram to redirect the infrared light signals to eye 200. For example, a single infrared hologram may have different regions designed and positioned to respond to infrared light signals from a particular optical element of optical splitter 132. In another example, optical combiner 140 includes a set of multiplexed infrared holograms, such as angle-multiplexed infrared holograms, to redirect the infrared light signals to eye 200. For example, a set of multiplexed infrared holograms may include M infrared holograms, each of which is designed and positioned to respond to infrared light signals from one of the M optical elements of optical splitter 132. Design of optical combiner 140 may include the infrared hologram(s) or infrared hologram region(s) responding to infrared light signals with incident angles within a particular range of incident angles.

Eye tracking system 100 includes an infrared detector 144 to capture reflections of infrared light signals from eye 200 as a scan pattern is drawn on eye 200 by forming M illumination areas on eye 200. As used herein, the term "infrared detector" refers to a device that is sensitive to and responsive to infrared light. In one implementation, infrared detector 144 may be a single photodiode sensor or photodetector that is responsive to infrared light. In another implementation, infrared detector 144 may be an array of photodetectors that are responsive to infrared light. In yet another implementation, infrared detector 144 may be a complementary metal-oxide semiconductor (CMOS) camera having an array of sensors that are responsive to light in the infrared range.

FIG. 1 shows infrared detector 144 detecting reflections of infrared light from eye 200 by detecting reflections of infrared light from optical combiner 140. This is possible because optical combiner 140 will receive reflections of infrared light from eye 200. In general, infrared detector 144 may be suitably arranged to detect reflections of infrared light directly and/or indirectly from eye 200. The output of infrared detector 144 contains intensities of reflections of infrared light detected over a period of time in which eye 200 is scanned with infrared light. Based on the time at which each reflection of infrared light is detected, the scan position of optical scanner 112 corresponding to the reflection of infrared light may be determined. The scan position may be used to determine a point in a scan space from which the reflection of infrared light originated. Thus, using the output of infrared detector 144 and scan positions of optical scanner 112, collectively referred to as "eye tracking data", positions of features on the eye can be determined. In one example, information extracted from the eye tracking data may be used to determine a gaze position of an eye in a target space. In another example, information extracted from the eye tracking data may be used to verify the identity of a subject. In other examples, information extracted from the eye tracking data may be used to monitor changes in short term conditions of a subject, such as detecting eye fatigue or predicting trajectory of an eye of the subject, or may be used to monitor changes in long term conditions of a subject, such as changes related to age and/or disease. The term "subject", as used herein, may refer to a user of a device that incorporates eye tracking system 100.

Eye tracking system 100 uses M virtual light projectors to draw a scan pattern on eye 200. Each virtual light projector forms an illumination area on the eye, as shown at 204a, 204b, 204c, 204d in FIG. 2. It is possible to imagine each illumination area as a window through which eye 200 may be viewed. Given that the illumination areas are shifted relative to each other, i.e., the boundaries of the illumination areas are not aligned, the virtual light projectors will illuminate different parts of eye 200 from different angles or perspectives. Thus, for example, four illumination areas that are shifted relative to each other will provide four different angles from which eye 200 may be scanned. In eye tracking system 100, these M sub-scans corresponding to M illumination areas are recorded per scan period by infrared detector 144. The extra information available per scan period from the M sub-scans can be exploited in real-time eye tracking applications, e.g., to improve the accuracy and robustness of eye tracking, to increase the sampling frequency of eye tracking, to make predictions about eye movement, or to determine if the eye is experiencing fatigue, which may be used to trigger other human-computer interaction (HCl) functions.

Figure 4A:
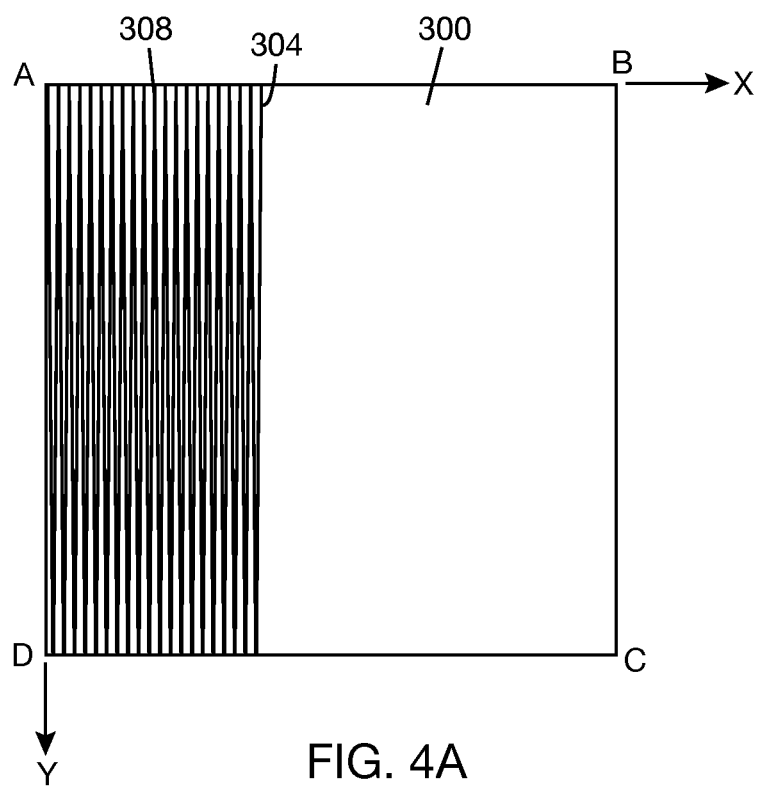
FIG. 4A is a diagram of a scan space and illustration of drawing a raster pattern in the scan space.

For illustration purposes, FIG. 4A shows a representation of a scan space 300, which may be a 2D space containing the 2D coordinates of the scan pattern to be drawn on the eye. Each point in the scan space 300 may be correlated to positions of scan element(s), such as scan mirror(s), of the optical scanner (112 in FIG. 1). In one implementation, the scan pattern drawn on the eye is a raster pattern. However, other scan patterns besides a raster pattern may be drawn on the eye, such as spiral pattern or some type of oscillating pattern—this may require adjustments to the design of the optical scanner. In the illustration of FIG. 4A, scan space 300 is bounded by box ABCD. For vertical scanning, X axis represents the slow scan direction of the scanner, and Y axis represents the fast scan direction of the scanner. For horizontal scanning, the reverse is true, i.e., X axis represents the fast direction of the scanner and Y axis represents the slow direction of the scanner. To draw a raster pattern using vertical scanning, the optical scanner moves a spot beam back and forth between line AB and DC at a relatively fast speed, appearing as scan lines 304. While moving the spot beam back and forth between lines AB and DC, the optical scanner also moves the beam spot in the X direction at a relatively slow speed, resulting in a zig zag pattern (raster pattern) 308 between lines AB and DC. Each position of the spot beam in scan space 300 is formed by an infrared light signal from the infrared light source (108 in FIG. 1).

Figure 4B:
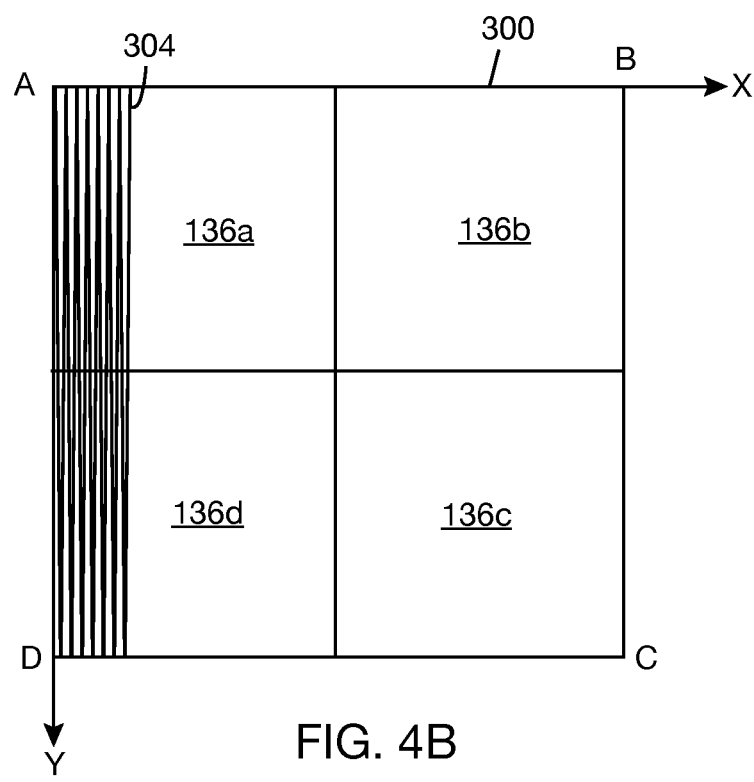
FIG. 4B is a diagram showing facets of an optical splitter on a plane and the scan space of FIG. 4A superimposed on the facets.

FIG. 4B shows M facets 136a, 136b, 136c, 136d of the optical splitter (132 in FIG. 1) on a plane—this corresponds to projecting the side of the optical splitter including the facets onto a plane or viewing the side of the splitter including the facets head-on. To illustrate mapping between scan space 300 and facets 136a, 136b, 136c, 136d, FIG. 4B shows scan space 300 superimposed on facets 136a, 136b, 136c, 136d. A few scan lines 304 are shown in FIG. 4B for illustrative purposes. Over each scan period, each of facets 136a, 136b, 136c, 136d will receive infrared light signals from scan space 300 depending on the position of the infrared light signal in scan space 300.

Figure 4C:
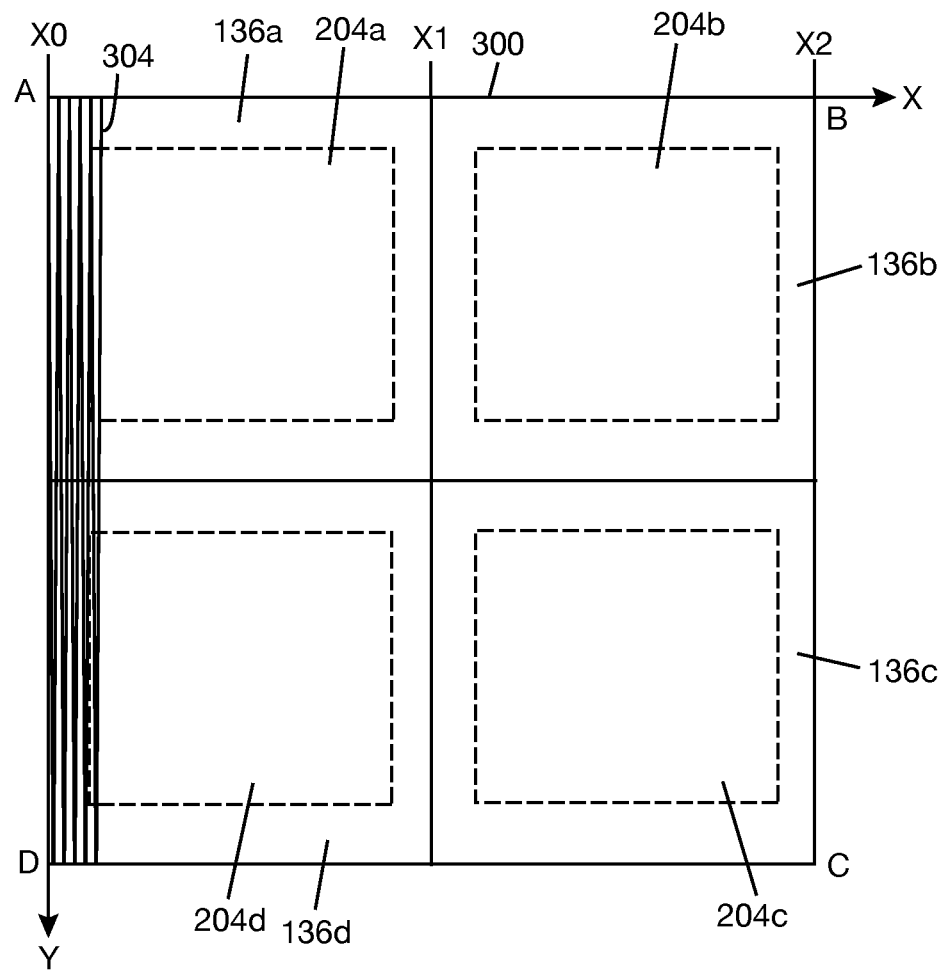
FIG. 4C is a diagram showing illumination areas corresponding to the facets and scan space of FIG. 4B.

FIG. 4C shows illumination areas 204a, 204b 204c, 204d corresponding to facets 136a, 136b, 136c, 136d. Over each scan period, infrared light signals from each of the facets will contribute to the corresponding illumination area. An observation can be made about the arrangement of facets 136a, 136b, 136c, 136d relative to scan space 300. For a first fraction T1 of the scan period corresponding to drawing of the scan lines 304 between X0 and X1, the eye can be scanned through light projected to illumination areas 204a, 204d from facets 136a, 136d. For a second fraction T2 of the scan period corresponding to drawing of the scan lines 304 from X1 to X2, the eye can be scanned through light projected to illumination areas 204b, 204c from facets 136b, 136c. This means that the sub-scans obtained from T2 will be temporally separated from the sub-scans obtained from T1. Temporal spacing between scanning of the eye within a scan period presents an opportunity to collect temporally separated updates on the position of the eye.

Figure 4D:
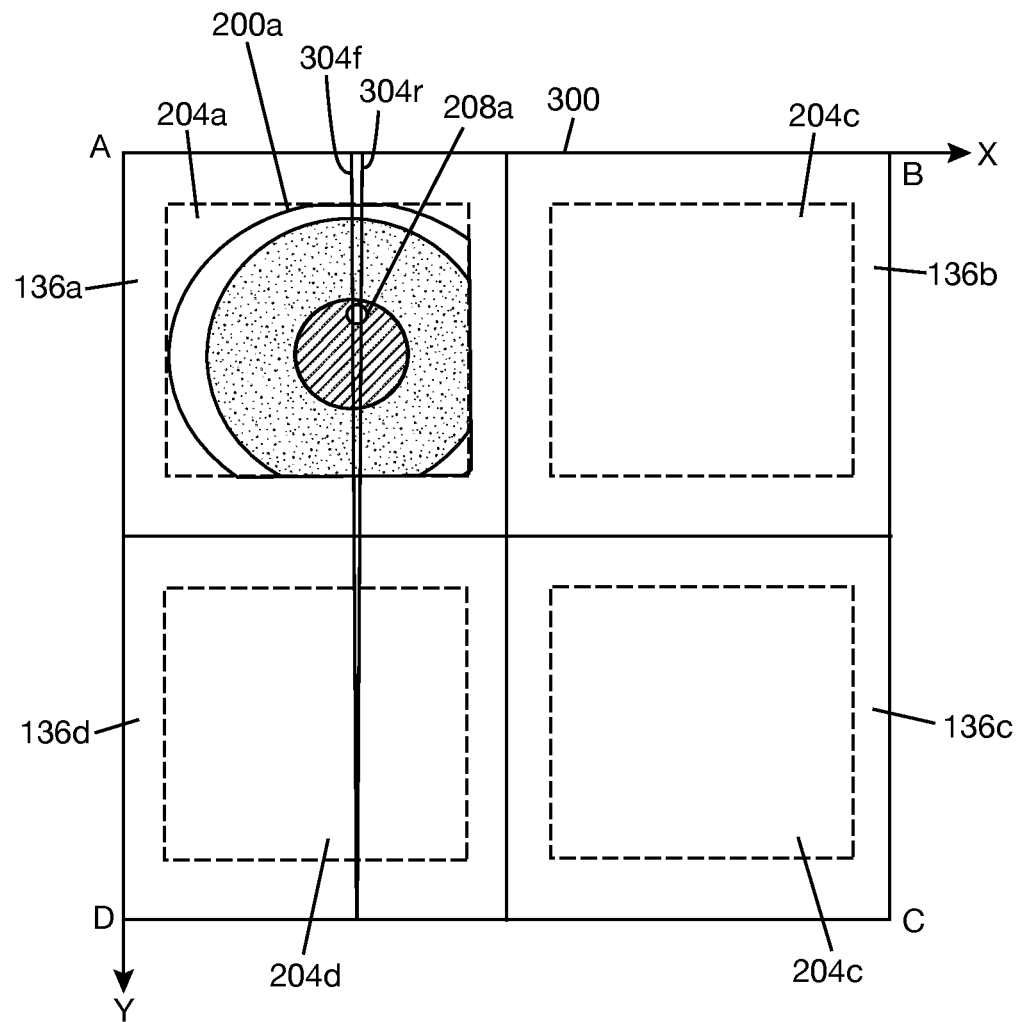
FIG. 4D is a diagram showing forward and reverse scanning of a glint.

Each portion of scan space 300 from which a facet, e.g., 136a, 136b, 136c, 136d, receives infrared light signals may be referred to as a scan subspace. Scan space 300 may be thought of as including a forward scan space containing the positions of the infrared light signals in the forward direction, i.e., from line AB to line DC in FIGS. 4A-4C, and a reverse scan space containing the positions of the infrared light signals in the reverse direction, i.e., from line DC to line AB in FIGS. 4A-4C. Similarly, each scan subspace may be thought of as including a forward scan subspace and a reverse scan subspace. Consider an eye tracking feature such as a glint. For illustration purposes, FIG. 4D shows a glint 208a on an eye portion 200a viewable through illumination area 204a (although not shown, the same glint may be viewable through the other illumination areas). If an edge detector is being used to detect glint 208a, for example, the edge detector will output a first signal representative of glint 208a when a forward scan line, e.g., scan line 304f, intersects the glint and a second signal representative of glint 208a when a successive reverse scan line, e.g., scan line 304r, intersects the glint. As far as the edge detector is concerned, these are two temporally separated glints. The first signal may be mapped to a first position of glint 208a in the forward scan subspace corresponding to facet 136a, and the second signal may be mapped to a second position of the glint in the reverse scan subspace corresponding to facet 136a. There are now two options for dealing with these two positions. One option is to integrate these two positions such that glint 208a has a single position in the scan subspace. Another option is to treat glint 208a as including a forward glint having a first position in the forward scan subspace and a reverse glint having a second position in the reverse scan subspace. An eye tracking scheme may choose to use either option to process glint data.

Figure 5:
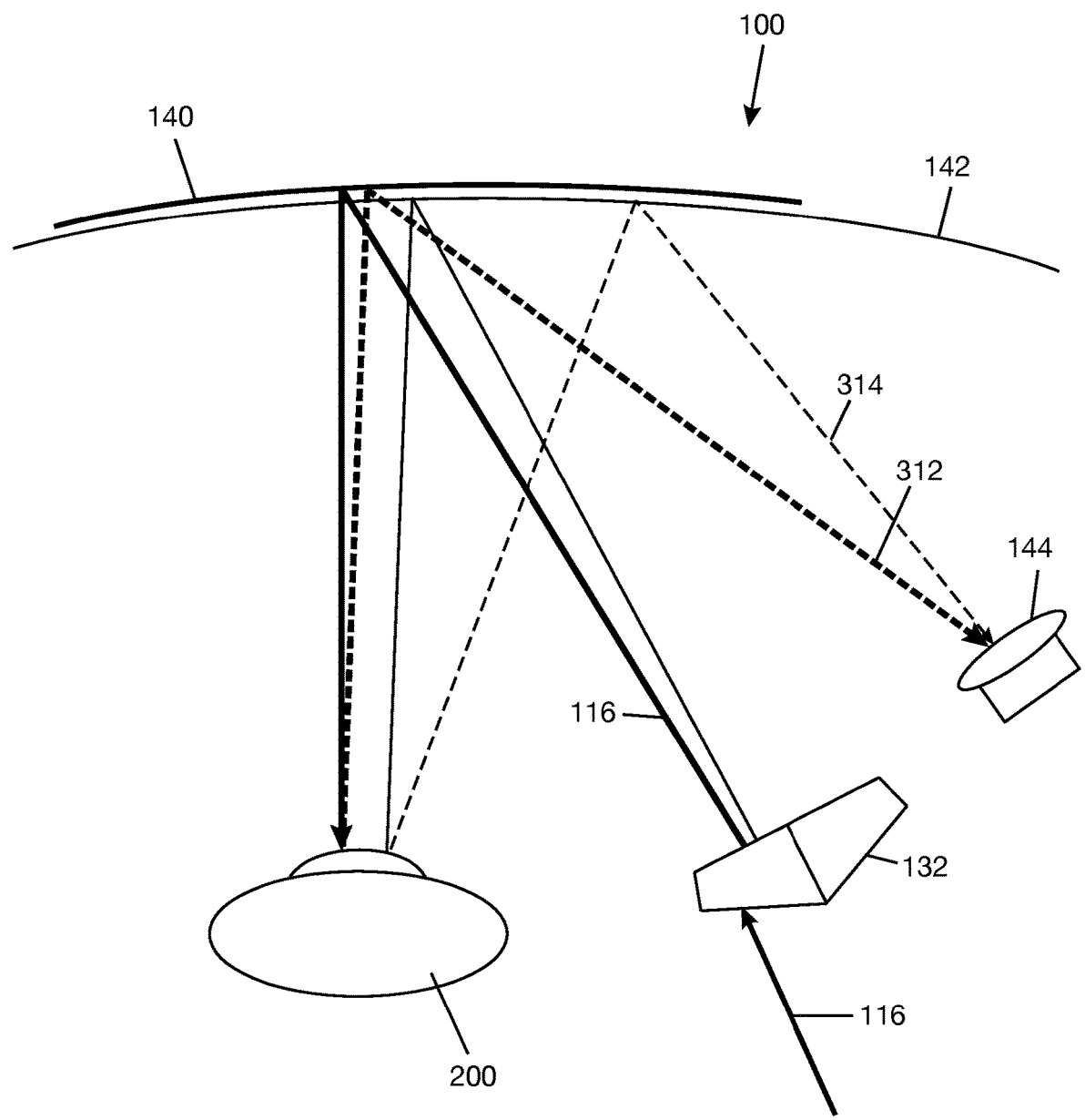
FIG. 5 is a schematic diagram showing detection of reflections of infrared light from an eye along multiple paths.

FIG. 5 shows that reflections of infrared light signals may reach infrared detector 144 along a primary path 312 and along a secondary path 314. In the example shown in FIG. 5, light along the primary path 312 goes from eye 200 back to optical combiner 140 and then reflects off optical combiner 140 to infrared detector 144. Light along the secondary path 312 goes from eye 200 to lens 142 and then reflects off lens 142 to infrared detector 144. For each sub-scan of the eye, a primary glint can be identified from the reflections that reach infrared detector along primary path 312 and an associated secondary glint can be identified from the reflections that reach infrared detector along secondary path 314 (there may be additional secondary paths, such as directly from the eye to the infrared detector). The primary glint and associated secondary glint will be temporally separated, i.e., arriving at the infrared detector at different times. By identifying the primary and secondary glints in each sub-scan, the number of temporally separate glint data points to use in updating the position of the eye is effectively doubled. Thus, if there are M sub-scans over a scan period, 2×M glints can be obtained over the scan period. It should be noted that primary and secondary glints do not depend on the presence of optical splitter 132, or creation of virtual light projectors, in the projection path. That is, primary and secondary glints may be detected if infrared light goes from scanning light projector (104 in FIG. 1) to optical combiner 140 without the intervention of optical splitter 132. An eye tracking scheme may choose to use only the primary glints or both the primary and secondary glints. Primary and secondary glints also present an opportunity to determine a curvature of the eye. If the geometric relationship between infrared detector 144 and optical combiner 140 are known, the time separation between associated primary and secondary glints, e.g., glints belonging to the same sub-scan (or scan if optical splitter 132 is not used and/or there is only one scan per scan period), can be used to estimate a curvature of the eye.

Figure 6:
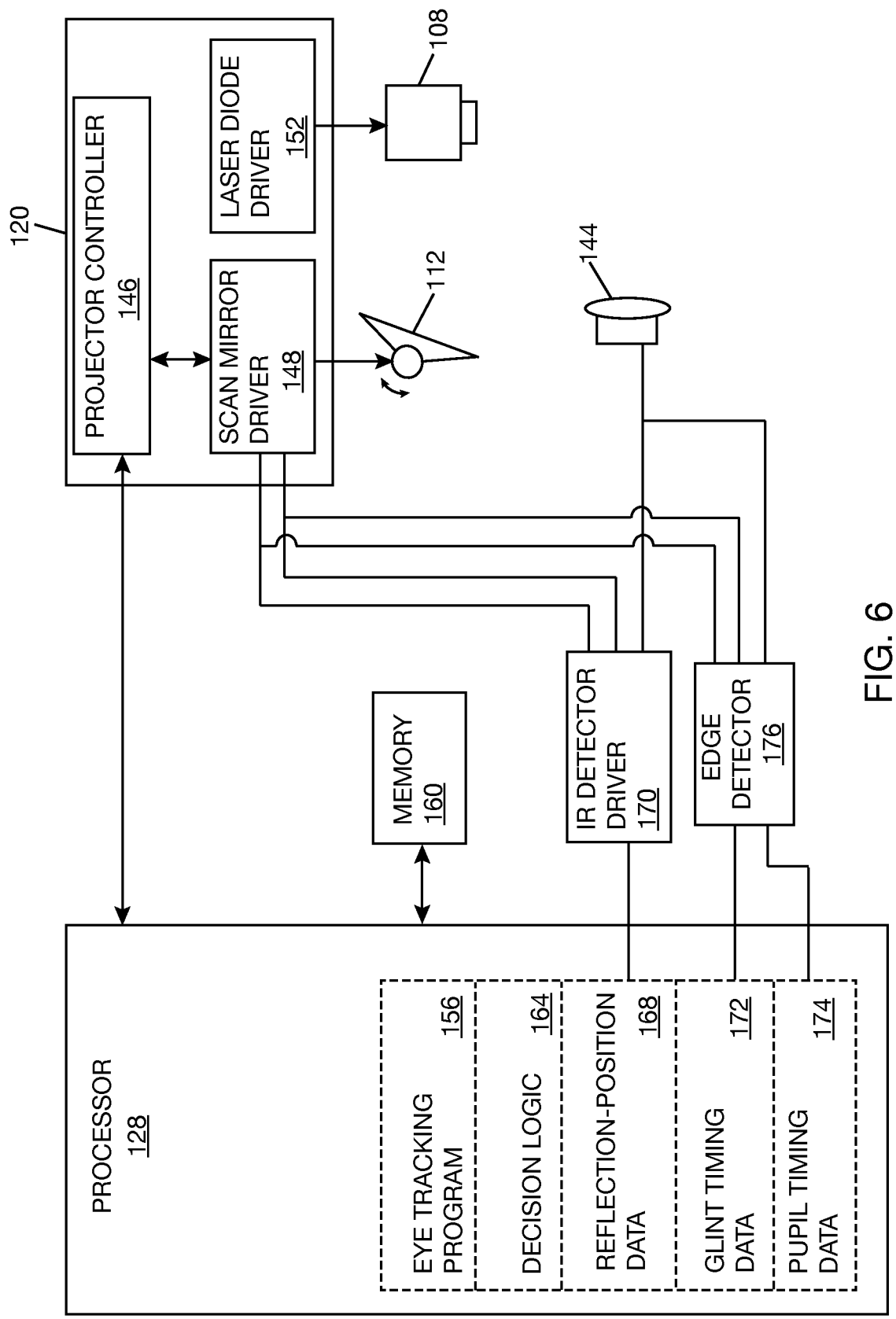
FIG. 6 is a block diagram showing a processor and scan engine of the eye tracking system of FIG. 1 in communication with other components of the eye tracking system.

Returning to FIG. 1, infrared laser diode 108 and optical scanner 112 are communicatively coupled to a scan engine 120. FIG. 6 shows scan engine 120 communicatively coupled to a processor 128. Processor 128 may be a programmed computer that performs computational operations. For example, processor 128 may be a central processing unit (CPU), a microprocessor, a controller, an application specific integrated circuit (ASIC), system on chip (SOC) or a field-programmable gate array (FPGA). In one implementation, scan engine 120 may include a projector controller 146, a scan mirror driver 148, and a laser diode driver 152. Infrared light source 108 is operated by laser diode driver 152. In one implementation, laser diode driver 152 operates infrared light source 108 to continuously generate infrared light. In another implementation, laser diode driver 152 receives controls from projector controller 146 and operates infrared light source 108 in response to those controls. Scan mirror driver 148 operates optical scanner 112, or scan mirror(s) in optical scanner 112. In one implementation, scan mirror driver 148 operates autonomously. For example, scan mirror driver 148 may be configured to drive scan mirror(s) through a range of positions corresponding to drawing a raster pattern. However, if it is desired to have some influence over operation of the optical scanner 112, scan mirror driver 148 may receive controls from projector controller 146 and operate optical scanner 112 in response to the controls. In one example, projector controller 146 may receive a bitmap from processor 128. The bitmap may include infrared light intensity values for points in the scan space. During each scan period, projector controller 146 may receive an indication of the next position that the optical scanner 112 will be in and provide the laser diode driver 152 with the appropriate infrared light intensity to generate for that position. This allows a nuanced scan pattern, e.g., one with varying intensity or with holes, or different scan patterns to be drawn over the eye.

For illustration purposes, processor 128 is shown executing an eye tracking program 156. Eye tracking program 156 may be stored in memory 160 and accessed by processor 128 at run time. Memory 160 may be a non-transitory processor-readable storage medium that stores data and instructions and may include one or more of random-access memory (RAM), read-only memory (ROM), Flash memory, solid state drive, or other processor-readable storage medium. Eye tracking program 156 includes decision logic 164, which when executed by processor 128 tracks the gaze position of an eye in a target space in a field of view of the eye. Where processor 128 provides a bitmap to projector controller 146 for control of optical scanner 112 and infrared light source 108, the bitmap may be generated according to instructions in decision logic 164. Eye tracking program 156 receives reflection-position data 168 from infrared (IR) detector driver 170. Infrared detector driver 170 is communicatively coupled to infrared detector 144 and scan mirror driver 148. Infrared detector driver 170 receives samples of the output of infrared detector 144, which are reflections of infrared light from the eye. Infrared detector driver 170 may include an ADC (not shown separately) to convert the infrared detector output samples to digital signals. Infrared detector driver 170 also receives mirror position timing signals, which are representative of the scan positions of the optical scanner, from scan mirror driver 148. The timing signals allow the position of the optical scanner 112 in the scan space to be correlated to the samples of infrared detector output. In one implementation, the intensities of reflections detected by infrared detector 144 and mirror position timing signals from scan mirror driver 148 make up reflection-position data 168.

In one example, an edge detector 176 detects glint edges from an output of the infrared detector 144 and provides glint timing data 172 to eye tracking program 156. In one example, glint timing data 172 includes the time of detection of each glint edge relative to the scan period. A single time may be outputted by edge detector 176 per glint edge, or two times may be outputted by edge detector 176 per glint edge—a first time to indicate the position of the glint edge relative to a first scan axis and a second time to indicate the position of the glint edge relative to a second scan axis that is orthogonal to the first scan axis. Eye tracking program 156 can use glint timing data 172 to determine the center positions of the glints in the scan space. Edge detector 176 may also detect pupil edges from an output of infrared detector 144 and provide pupil timing data 174 to eye tracking program 156. An example edge detector circuit that may be used as edge detector 176 is disclosed in U.S. Provisional Application No. 62/680,273, titled "Edge Detection Circuit and Detection of Features on Illuminated Eye using the Same", the content of which is incorporated herein by reference. In one implementation, using glint timing data 172 and/or reflection-position data 168, eye tracking program 156 determines a gaze position of the eye in a target space in a field of view of the eye.

Figure 7:
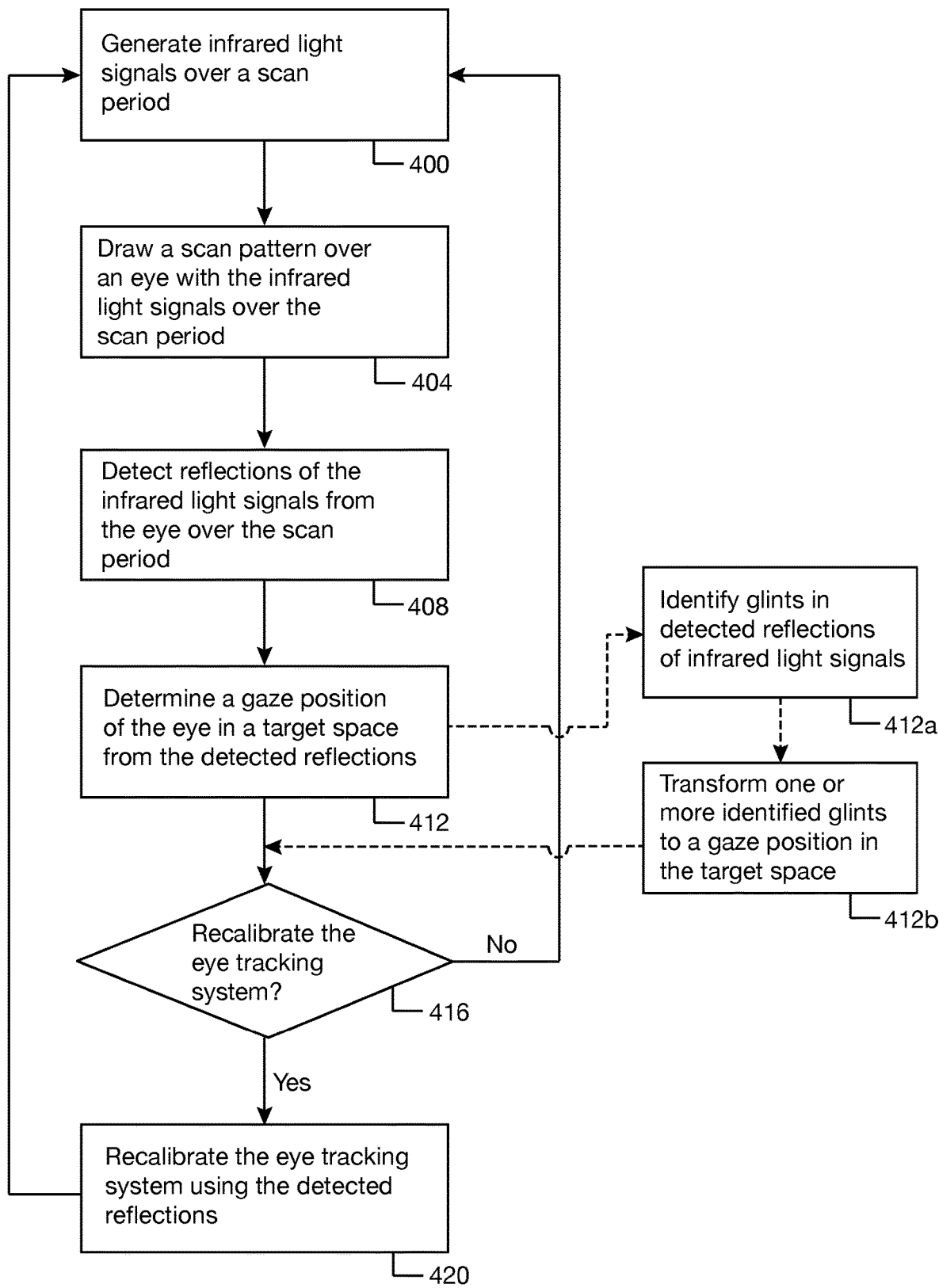
FIG. 7 is a flow chart showing a method of eye tracking.
Figure 9:
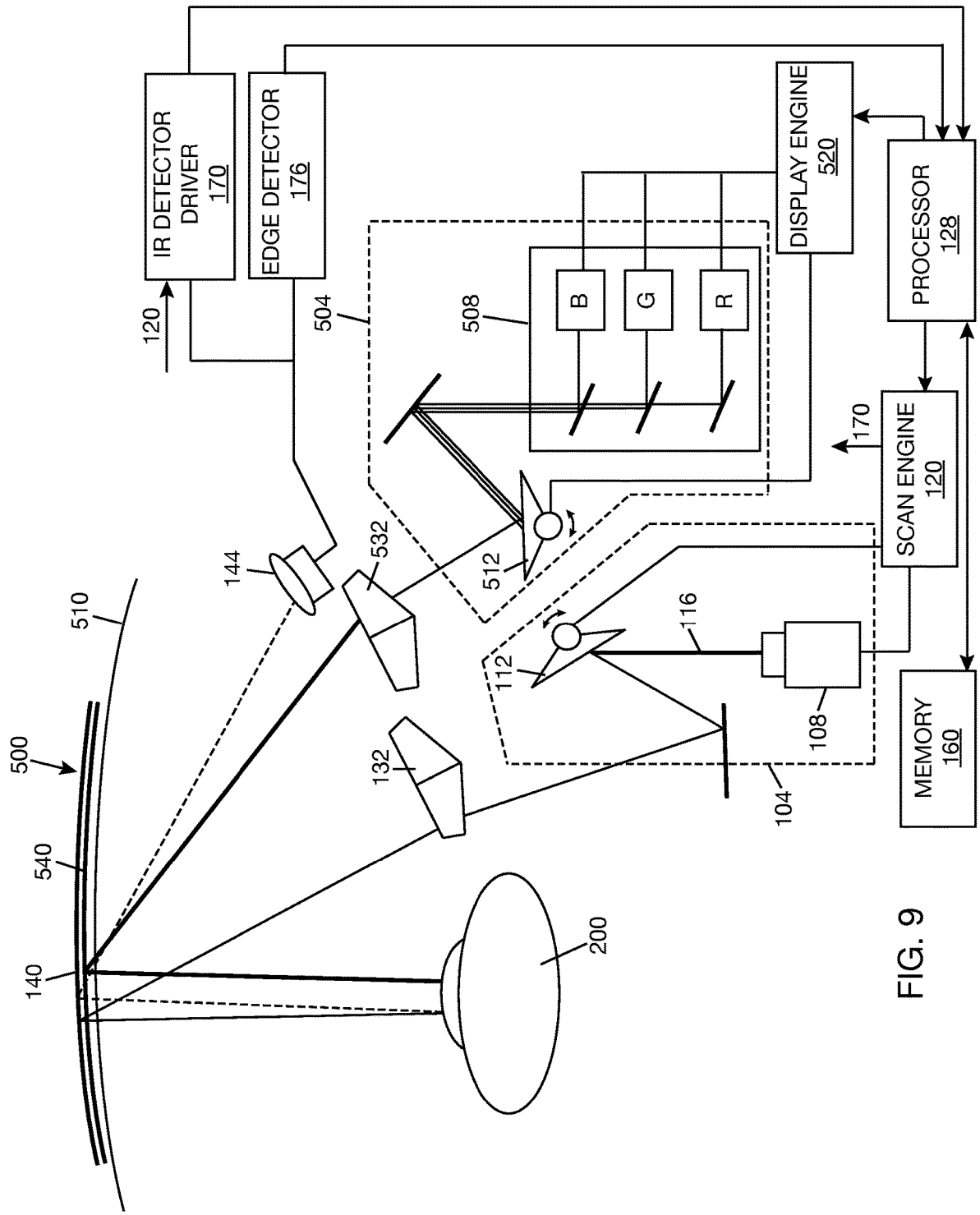
FIG. 9 is a diagram illustrating integration of an eye tracking system with a wearable heads-up display where the optical systems of the eye tracking system and wearable heads-up display are decoupled according to one example.
Figure 10:
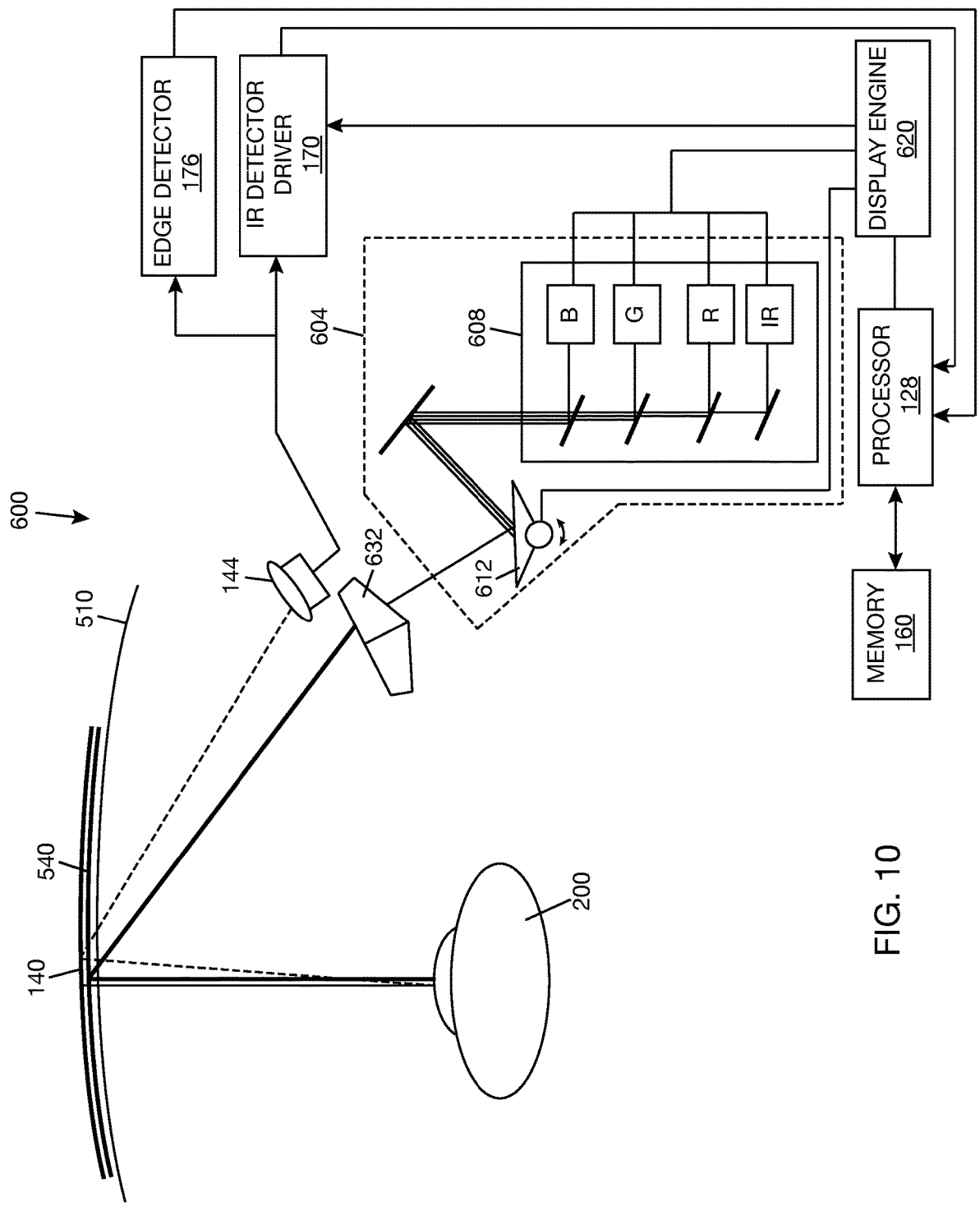
FIG. 10 is a diagram illustrating integration of an eye tracking system of with a wearable heads-up display where the optical systems of the eye tracking system and wearable heads-up display are coupled according to another example.

FIG. 7 is a flow diagram illustrating one implementation of a method of tracking a gaze position of an eye in a target space using the eye tracking system described with reference to FIGS. 1-6. The target space may be, for example, a display space of a wearable heads-up display. In this case, the eye tracking system will need to be integrated into the wearable heads-up display. Examples of integration of the eye tracking system into a wearable heads-up display are shown in FIGS. 9 and 10. The method may be implemented as the decision logic (e.g., 164 in FIG. 6) of an eye tracking program (e.g., 156 in FIG. 6). The method includes performing a plurality of scans of the eye with infrared light within an eye tracking period T. Each scan is performed over a scan period, and each scan includes M sub-scans of the eye due to the M illumination areas formed during the scan period, where M>1. For illustrative purposes, M=4 may be used, but M is not limited to 4. At 400, for each scan, the method includes generating infrared light signals (e.g., using infrared light source 108 in FIGS. 1 and 6) over a scan period. At 404, the method includes drawing a scan pattern on the eye using the infrared light signals generated over the scan period. Drawing the scan pattern on the eye includes directing the infrared light signals (e.g., by optical scanner 112 in FIG. 1) to M virtual light projectors (e.g., created by optical splitter 132 in FIG. 1) and projecting the infrared light signals from the M virtual light projectors to the eye to form M illumination areas (e.g., 204a, 204b, 204c, 204d in FIG. 2) on the eye. Each illumination area is formed by a subset of the infrared light signals coming from the corresponding virtual light projector. Each illumination area contains a fraction of the scan pattern drawn on the eye. If the scan pattern is a raster pattern, each fraction of the scan pattern will itself be a raster pattern. At 408, the method includes detecting reflections of infrared light signals (e.g., using infrared detector 144 in FIGS. 1 and 6) from the eye over the scan period. At 412, the method includes determining a gaze position of the eye in the target space from the detected reflections of infrared light signals. Acts 400 to 412 may be repeated for as many scan periods as possible, or desired, within the eye tracking period T.

The method of determining a gaze position of the eye from the detected reflections 412 may include identifying one or more glints from the detected reflections of the infrared light signals, as shown at 412a, and using the one or more glints to determine the gaze position of the eye in the target space, as shown at 412b. At 412a, the edge detector (176 in FIG. 6) may be used to identify one or more glints from the output of the infrared detector (144 in FIG. 6). In one example, the edge detector outputs a time signal when the edge detector detects an intensity in the output signal of the infrared detector that exceeds an intensity threshold. The intensity that exceeds an intensity threshold corresponds to a point on an edge of a glint. The set of times at which the edge of a glint is detected can be used to locate the center position of the glint in the scan space. One primary glint can be identified for each illumination area of the eye. Thus, M primary glints in the scan space can be identified for each scan period, or 2×M primary glints in the forward and reverse scan spaces can be identified for each scan period. Secondary glints may also be identified for each scan period. Each primary glint may have one or more companion secondary glints (each secondary path will give one companion secondary glint). At 412b, some or all of the glints identified in a scan period may be used to determine the gaze position of the eye in the target space for the scan period.

In one implementation, multiple glints are identified from the reflections of infrared light signals detected over the scan period at 412a in FIG. 7, and a combination of the multiple glints is used to determine the gaze position in the target space at 412b. In one example, the multiple glints may be M primary glints in the scan space, or 2×M primary glints in the forward and reverse scan spaces. In another example, the multiple glints may be a combination of primary and secondary glints.

In one example of determining the gaze position by combining glints at 412b, the glint center positions of the multiple glints in the scan space are determined. Each glint center position is transformed into a gaze position in the target space using a mapping function F1 that transforms coordinates from the scan space to coordinates in the target space. (Or, each glint center position in a forward scan space is transformed into a gaze position in the target space using a mapping function F1(F) that transforms coordinates from the forward scan space to coordinates in the target space, and each glint center position in a reverse scan space is transformed into a gaze position in the target space using a mapping function F1(R) that transforms coordinates from the reverse scan space to coordinates in the target space.) This would give multiple gaze positions (corresponding to the number of glint center positions) in the target space. The multiple gaze positions may be averaged, or otherwise combined, to obtain a single gaze position for the scan period.

The mapping function F1 mentioned above may be determined beforehand during a calibration process. A general procedure for determining the mapping function F1 may include displaying markers in the target space in a predetermined sequence. For each marker displayed, an eye focusing on the marker is scanned with infrared light using the eye tracking system in FIG. 1, and glint timing data (or reflection-position data) are collected for the scan period in which the eye is focusing on the marker. For each marker position in the target space, multiple glints are identified from the glint timing data (or reflection-position data), and corresponding glint center positions of the glints are determined. From the marker positions in the target space and the corresponding glint center positions ("calibration data"), mapping function F1 may be determined between the scan space and the target space. Mapping function F1 may be determined by, for example, applying geometric transformations, affine transformations, or neural networks to the calibration data. (If forward and reverse scan spaces are used, then mapping functions F1(F) and F1(R) would be determined from the calibration data.)

In another example of determining the gaze position by combining glints at 412b, the scan space is divided into M scan subspaces, e.g., scan subspaces $SS_1$, $SS_2$, ..., $SS_M$, where each scan subspace contains at least one of the plurality of glints identified at 412a. (Or, the scan space could be divided into M forward scan subspaces, e.g., forward scan subspaces $SS(F)_1$, $SS(F)_2$, ..., $SS(F)_M$, and M reverse scan subspaces, e.g., $SS(R)_1$, $SS(R)_2$, ..., $SS(R)_M$, where each scan subspace contains at least one of the plurality of glints.) Each scan subspace will contain one primary glint and may further contain one or more secondary glints. The coordinates of the glints in the scan subspaces $SS_1$, $SS_2$, ..., $SS_M$ are transformed to gaze positions in the target space by mapping functions $F1_1$, $F1_2$, ..., $F1_M$, respectively. (Or, the coordinates of the glints in the forward scan subspaces $SS(F)_1$, $SS(F)_2$, ..., $SS(F)_M$ are transformed to gaze positions in the target space by mapping functions $F1(F)_1$, $F1(F)_2$, ..., $F1(F)_M$, and the coordinates of the glints in the reverse scan subspaces $SS(R)_1$, $SS(R)_2$, ..., $SS(R)_M$ are transformed to gaze positions in the target space by mapping functions $F1(R)_1$, $F1(R)_2$, ..., $F1(R)_M$.) This will result in multiple gaze positions. The multiple gaze positions may be averaged, or otherwise combined, to obtain a final gaze position in the target space for the scan period.

The mapping functions $F1_1, F1_2, \ldots, F1_M$ mentioned above may be determined beforehand during a calibration process. A general procedure for determining mapping functions $F1_1, F1_2, \ldots, F1$ includes displaying markers in the target space in a predetermined sequence. For each marker displayed, an eye focusing on the marker is scanned with infrared light using the eye tracking system in FIG. 1, and glint timing data (or reflection-position data) are collected for the scan period in which the eye is focusing on the marker. For each marker position in the target space, multiple glints are identified from the glint timing data (or reflection-position data). The glints identified for each marker position can be separated into scan subspaces, e.g., $SS_1, SS_2, \ldots, SS_M$, and the glint center position of each glint in each scan subspace can be determined. Each set of glint center positions in a scan subspace and corresponding marker positions provide "subspace calibration data". There will be M sets of such subspace calibration data. Each of the subspace calibration data sets can be used to determine one of the mapping functions $F1_1, F1_2, \ldots, F1_M$ between the respective scan subspace and the target space. The mapping functions $F1_1, F1_2, \ldots, F1_M$ may be determined by, for example, applying geometric transformations, affine transformations, or neural networks to the subspace calibration data. (If forward and reverse scan subspaces are used, there would be 2×M sets of subspace calibration data. The mapping functions $F1(F)_1, F1(F)_2, \ldots, F1(F)_M$ and $F1(R)_1, F1(R)_2, \ldots, F1(R)_M$ would be determined from the 2× M sets of subspace calibration data.)

In another implementation, multiple glints are identified from reflections of infrared light signals detected over the scan period at 412a in FIG. 7, and each of the multiple glints is used separately to determine a gaze position in the target space at 412b. This allows for updating the gaze position multiple times within each scan period, e.g., M times if transformation of coordinates is from the scan space to the target space or 2×M times if transformation of coordinates is from the forward and reverse scan spaces to the target space. At 412b, a glint center position may be determined for each glint in the scan space (or for each glint in the forward and reverse scan spaces), and the glint center position may be transformed into a gaze position in the target space using the mapping function F1 that maps coordinates from the scan space to coordinates in the target space (or the mapping functions F1(F) and F1(R) that map coordinates from the forward scan space and the reverse scan space, respectively, to coordinates in the target space). Alternatively, a glint center position may be determined for each glint in a respective scan subspace (or for each glint in respective forward and reverse scan subspaces), and the glint center position may be transformed into a gaze position in the target space using the mapping functions $F1_j$ that maps coordinates from the respective scan subspace SS to coordinates in the target space (or the mapping functions $F1(F)_j$ and $F1(R)_j$ that map coordinates from the forward scan space and the reverse scan space, respectively, to coordinates in the target space).

In another implementation, multiple glints—these may be only primary glints or both primary and secondary glints—are identified from the reflections of infrared light signals detected over the scan period at 412a in FIG. 7, and the center positions of the glints in the scan space are determined and fed into a trained model at 412b. The trained model transforms the glint center positions into a gaze position in the target space. The trained model may be trained using glint timing data (or reflection-position data) collected in a learning process. Alternatively, 412a may be omitted, and the trained model may simply take the reflection-position data (detected reflections of infrared light signals and corresponding optical scanner positions or timing signals) or the glint timing data for the scan period and determine the gaze position in the target space based on the reflection-position data or the glint timing data.

As described above, mapping function(s) or trained models are used to transform coordinates in a scan space or scan subspaces to coordinates in a target space. Over time, the scan space or scan subspaces may drift relative to the target space, which may result in inaccuracies in determining gaze position using the original mapping function(s) or trained models. At 416 in FIG. 7, the method of eye tracking may include determining if recalibration should be performed to correct any drifts in the scan space or scan subspaces relative to the target space. Recalibration may be at scheduled times, such as after every k scans, or may be in response to an external command or stimulus—if the eye tracking system is integrated into a wearable heads-up display, such external command or stimulus may come from a program running on the wearable heads-up display or a motion-sensitive sensor coupled to the wearable heads-up display. At 420, recalibration of the eye tracking system may be performed. It may not be necessary to complete the recalibration before starting the next scan of the eye. That is, the recalibration could occur while drawing a scan pattern over the eye in the next scan period.

Figure 8:
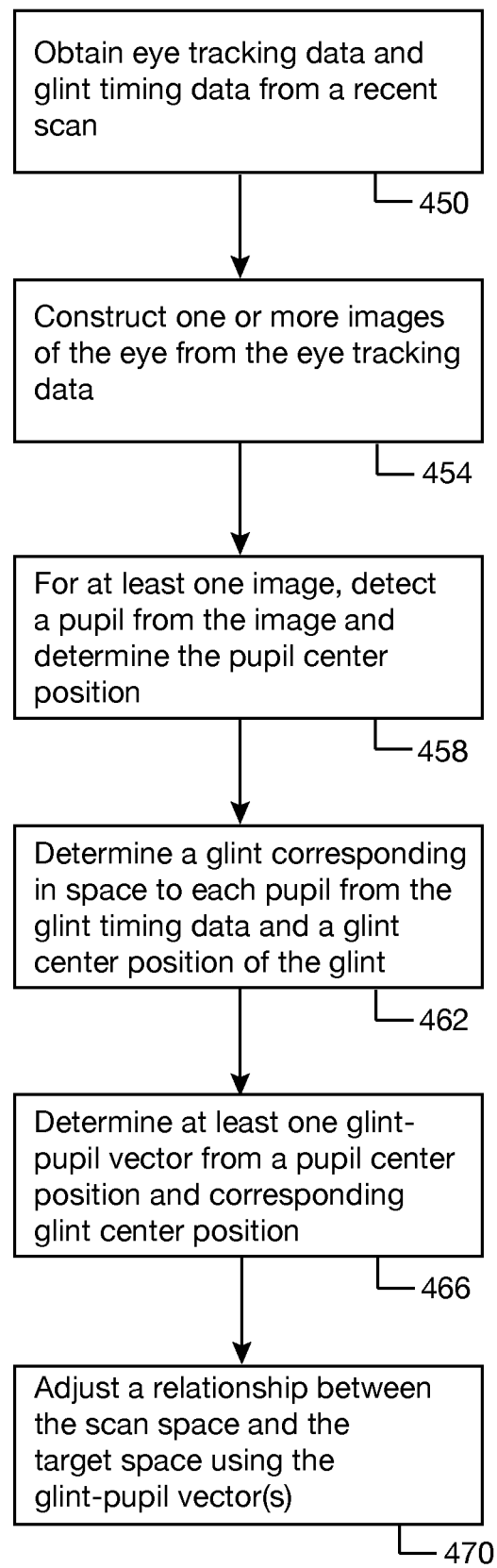
FIG. 8 is a flow chart of a method of recalibrating an eye tracking system.

FIG. 8 shows one example of a method of recalibrating the eye tracking system (420 in FIG. 7). At 450, reflection-position data (or pupil timing data) and glint timing data are obtained from a recent scan of the eye (i.e., a recent execution of acts 400 to 408 in FIG. 7)—this may be a scan that occurred just before the trigger to recalibrate or just after the trigger to recalibrate or some other recent scan. At 454, in one example, one image may be constructed from the entire reflection-position data for the scan period. This one image will have M portions, each portion corresponding to an image of the eye from one of the illumination areas. For all practical purposes, each image portion containing an image of the eye may be referred to as an image of the eye. In another example of 454, M separate images of the eye may be constructed—reflection-position data from each illumination area will give one image of the eye. At 458, from each image of the eye, the pupil is detected, and the pupil center position is determined. (Instead of constructing image(s) from the reflection-position data and determining the pupil center position from the image(s) at 458, pupil timing data may be obtained at 450 and used to determine the pupil center position.) Each image of the eye will have one corresponding primary glint in the glint timing data (or two primary glints in the glint timing data if forward and reverse detections of the primary glint are considered separately). At 462, from the glint timing data, the glint center position of at least one glint corresponding in subspace to the pupil is determined, e.g., the glint and pupil should come from detected reflections from the same illumination area on the eye. At 466, using the pupil center position and glint center position in the same subspace, a glint-pupil vector can be determined. Per pupil detection, at least one glint-pupil vector may be determined at 466 (if there are two primary glints in the same subspace as the pupil due to considering forward and reverse glint detections separately, two glint-pupil vectors may be determined at 466). At 470, one of the glint-pupil vectors determined at 466, or a combination of the glint-pupil vectors determined at 466, is used to adjust a relationship between the scan space and the target space to correct for any drifts of the scan space relative to the target space. Act 470 will depend on the scheme used in transforming coordinates from the scan space to the target space.

In one implementation of recalibrating the eye tracking system, M glint-pupil vectors (or 2×M glint-pupil vectors if forward and reverse glint detections are considered) are determined following acts 450 to 466, and act 470 includes transforming each of these glint-pupil vectors from a glint-pupil vector space to a "calibrating gaze position". A mapping function F2 that transforms coordinates from the glint-pupil vector space to coordinates in the target space is used to transform the glint-pupil vectors to the calibrating gaze positions (or mapping functions F2(F) and F2(R) that transform coordinates from forward and reverse glint-pupil vector spaces to coordinates in the target space are used to transform the glint-pupil vectors to the calibrating gaze positions). These calibrating gaze positions are combined, e.g., by averaging, into a combined calibrating gaze position, which may be used as the gaze position in the target space for the recalibration period. Each of the M (or 2×M) glint pupil vectors has a corresponding glint center position, which was determined in 462. Mapping function F1, which transforms coordinates from the scan space to the target space, may be applied to each of these glint center positions to obtain a corresponding "unadjusted gaze position" in the target space (or mapping function F1(F) may be applied to each of the forward glint center positions to obtain a corresponding unadjusted gaze position, and mapping function F1(R) may be applied to each of the reverse glint center positions to obtain a corresponding unadjusted gaze position). The unadjusted gaze positions for all the glint center positions are combined, e.g., by averaging, into a combined unadjusted gaze position in the target space. A difference between the combined calibrating gaze position and the combined unadjusted gaze position will generally mean that adjustment of the mapping function F1 (or F1(F) and F1(R)) is needed.

Given mapping function F1 that transforms coordinates from the scan space to coordinates in the target space, act 470 may further include determining an adjusted mapping function F1' between the scan space and the target space based on the combined calibrating gaze position. That is, when the adjusted mapping function F1' is applied to glint center positions in the scan space, a combination, e.g., average, of the obtained "adjusted gaze positions" should be the same as the combined calibrating gaze position. In one example, the adjusted mapping function F1' is a mapping function F1 plus an offset that accounts for the difference between the combined calibrating gaze position and the combined unadjusted gaze position. In another example, a more complex approach may be used that involves recalculating the mapping function F1 between the scan space and the target space—this would be similar to the calibration procedure to obtain mapping function F1 with the exception that the marker positions in the target space will be replaced by the calibration gaze positions determined from the glint pupil vectors. (If using a scheme that considers forward and reverse glint detections separately, adjusted mapping functions F1(F)' and F1(R)' may be obtained in the same manner described above for adjusted mapping function F1'.)

The mapping function F2 mentioned above may be determined beforehand in a calibration process. A general procedure for determining mapping function F2 may include displaying markers in the target space in a predetermined sequence. For each marker displayed, an eye focusing on the marker is scanned with infrared light, from M virtual light projectors, and reflection-position data (or pupil timing data) and glint timing data are collected. M images of the eye can be constructed for each marker position. A pupil can be detected from each image, and a pupil center position of the pupil can be determined. (Or, pupil center position can be determined from the pupil timing data per illumination area.) Each pupil center position will have one corresponding primary glint in the glint timing data (or two corresponding primary glints in the glint timing data if forward and reverse detections of the primary glint are considered separately). A glint-pupil vector can be determined from each pupil center position and corresponding glint center position. From the marker positions in the target space and the corresponding combined glint-pupil vectors ("vector calibration data"), mapping function F2 may be determined between the glint-pupil vector space and the target space. Mapping function F2 may be determined by, for example, applying geometric transformations, affine transformations, or neural networks to the vector calibration data. (If forward and reverse glint-pupil vector spaces are used, then mapping functions F2(F) and F2(R) would be determined from the vector calibration data.)

In another implementation, recalibration of the eye tracking system may be at the subspace level. For example, M glint-pupil vectors are determined following acts 450 to 466, and act 470 includes dividing the glint-pupil vector space into M glint-pupil vector subspaces, e.g., glint-pupil vector subspaces $VS_1, VS_2, \ldots, VS_M$, where each glint-pupil vector subspace contains one of the M glint-pupil vectors determined at 466. Each glint-pupil vector subspace $VS_j$ will have a counterpart scan subspace $SS_j$, where j=1 to M. (Or, M forward glint-pupil vectors and M reverse glint-pupil vectors are determined following acts 450 to 466, and act 470 includes dividing the forward glint-pupil vector space into M forward glint-pupil vector spaces, e.g., glint-pupil vector subspaces $VS(F)_1, VS(F)_2, \ldots, VS(F)_M$, and dividing the reverse glint-pupil vector space into M reverse glint-pupil vector subspaces, e.g., glint-pupil vector subspaces $VS(R)_1, VS(R)_2, \ldots, VS(R)_M$. Each forward glint-pupil vector space $VS(F)_j$ will have a counterpart scan subspace $SS(F)_j$, and each reverse glint-pupil vector subspace $VS(R)_j$ will have a counterpart scan subspace $SS(R)_j$, where j=1 to M.) Act 470 further includes transforming the M glint-pupil vectors from $VS_1, VS_2, \ldots, VS_M$ to calibrating gaze positions in the target space TS using mapping functions $F2_1, F2_2, \ldots, F2_M$, respectively. This gives M calibrating gaze positions, e.g., $CG_1, CG_2, \ldots, CG_M$. (Or, act 470 includes transforming the M forward glint-pupil vectors from $VS(F)_1, VS(F)_2, \ldots, VS(F)_M$ to calibrating positions $CG(F)_1, CG(F)_2, \ldots, CG(F)_M$, respectively, in the target space TS and transforming the M reverse glint-pupil vectors from $VS(R)_1, VS(R)_2, \ldots, VS(R)_M$ to calibrating positions $CG(R)_1, CG(R)_2, \ldots, CG(R)_M$, respectively, in the target space TS.) If it is desired to update the gaze position during the recalibration period, these calibrating gaze positions may be combined, e.g., by averaging, to obtain a combined gaze position in the target space for the recalibration period.

Given mapping functions $F1_1, F1_2, \ldots, F1_M$ that transform coordinates from scan sub-spaces $SS_1, SS_2, \ldots, SS_M$, respectively, to coordinates in the target space TS, act 470 may further include determining adjusted mapping functions $F1_1', F1_2', \ldots, F1_M'$ between scan subspaces $SS_1, SS_2, \ldots, SS_M$ and the target space TS based on the calibrating gaze positions $CG_1, CG_2, \ldots, CG_M$. For example, from each glint-pupil vector space $VS_j$ (j=1 ... M), calibrating gaze position CG is obtained using mapping function $F2_j$. From a glint center position in scan subspace $SS_j$ (j=1 ... M), adjusted gaze position ACG is obtained using mapping function $F1_j'$. The adjustment to $F1_j$ to obtain adjusted $F1_j'$ should be such that CG and ACG are the same. This is similar to the example above, except that the adjustment is applied at a subspace level. The adjustments can be in the form of applying a respective offset to each of mapping function F1 or recalculating each of the mapping functions between the scan subspaces and the target space. (If forward and reverse scan subspaces are used, act 470 may instead include determining adjusted mapping functions $F(F)_1'$, $F1(F)_2'$, ..., $F1(F)_M'$ between forward scan subspaces $SS(F)_1$, $SS(F)_2$, ..., $SS(F)_M$ and the target space TS based on the calibrating gaze positions $CG(F)_1$, $CG(F)_2$, ..., $CG(F)_M$ and determining adjusted mapping functions $F1(R)_1'$, $F1(R)_2'$, ..., $F1(R)_M'$ between reverse scan subspaces $SS(R)_1$, $SS(R)_2$, ..., $SS(R)_M$ and the target space TS.)

Each of the mapping functions $F2_1$, $F2_2$, ..., $F2_M$ mentioned above may be determined beforehand in a calibration process. A general procedure for determining mapping functions $F2_1$, $F2_2$, ..., $F2_M$ may include displaying markers in the target space in a predetermined sequence. For each marker displayed, an eye focusing on the marker is scanned with infrared light, from M virtual light projectors, and reflection-position data (or pupil timing data) and/or glint timing data are collected. M images of the eye can be constructed for each marker position. A pupil can be detected from each image, and a pupil center position of the pupil can be determined. Alternatively, M pupil center positions can be determined from the pupil timing data. Thus, there will be M pupil center positions for each marker position. Also, there will be M glint center positions for each marker position if only M primary glints are considered. From the pupil center positions and glint center positions, M glint-pupil vectors can be determined for each marker position. M glint-pupil vector subspaces can be defined, each of the glint-pupil vector subspaces containing one glint-pupil vector corresponding to each marker position. Each set of glint-pupil vectors in a glint-pupil vector subspace and corresponding marker positions provide "subspace vector calibration data". There will M sets of such sub-subspace vector calibration data to determine mapping functions. Each of the sub-subspace vector calibration data sets can be used to determine a respective one of mapping functions $F2_1$, $F2_2$, ..., $F2_M$. The mapping functions $F2_1$, $F2_2$, ..., $F2_M$ may be determined by, for example, applying geometric transformations, affine transformations, or neural networks to the subspace vector calibration data. (If forward and reverse scan subspaces are used, there would be M sets of forward subspace vector calibration data and M sets of reverse subspace vector calibration data. The mapping functions $F2(F)_j$ and $F2(R)_j$, where j=1 ... M, would be determined from the M sets of forward subspace vector calibration data and the M sets of reverse subspace vector calibration data, respectively.)

Eye tracking system 100 may be integrated into a wearable heads-up display to enable the wearable heads-up display to obtain scan data from the eye while the user is wearing the wearable heads-up display. The wearable heads-up display may use the scan data for various purposes, such as eye tracking, user authentication, and monitoring one or more conditions of the user while the user is operating the wearable heads-up display, or the wearable heads-up display may simply collect and store the scan data for future analysis.

FIG. 9 shows one example of the eye tracking system (100 in FIG. 1) integrated into a wearable heads-up display system 500. The reference numbers of the eye tracking system used in FIG. 1 have been retained in FIG. 9 for continuity. The display part of the wearable heads-up display system includes a scanning light projector 504 that is operable to scan visible light over a target area. Scanning light projector 504 includes a laser module 508, which includes visible laser diodes, e.g., red laser diode (R), green laser diode (G), and blue laser diode (B), to provide visible light. In general, laser module 508 may have any number and combination of laser diodes, or visible light sources, to provide visible light. Scanning light projector 504 includes an optical scanner 512, which is positioned, oriented, and operable to receive visible light from laser module 508. Optical scanner 512 may include at least one scan mirror, which may be a 2D scan mirror or two orthogonally-oriented mono-axis mirrors. Display engine 520 provides controls to laser module 508 and optical scanner 512 according to display content to be projected to a target space in a field of view of eye 200. The display part of the wearable heads-up display system includes an optical splitter 532, which may have the same structure as optical splitter 132 of the eye tracking system, but for visible light. That is, optical splitter 532 has N optical elements with facets to create N virtual light projectors from which visible light can be projected to the eye. The eye tracking system uses M virtual light projectors to form M illumination areas on the eye, whereas the display system uses N virtual light projectors to project content to the N exit pupils formed proximate eye 200. In this example, both M and N are greater than 1. However, since the optical systems for the eye tracking system and the display system are decoupled, M does not have to be the same as N.

The display part of the wearable heads-up display includes an optical combiner 540 that is aligned to receive visible light from the optical splitter 532. In one example, optical combiner 540 may be a wavelength-multiplexed holographic optical element. In other examples, optical combiner 540 may be an angle-multiplexed holographic optical element or an angle- and wavelength-multiplexed holographic optical element. Optical combiner 540 may include at least one visible hologram that is responsive to visible light and unresponsive to infrared light. Optical combiner 540 receives visible light from the N virtual light projectors created by optical splitter 532 and directs the visible light to the N exit pupils formed proximate eye 200. Optical combiner 140 for infrared light and optical combiner 540 for visible light may be integrated into a single lens 510, such as an eyeglass.

In the wearable heads-up display system of FIG. 9, processor 128 may provide a frame buffer containing display content to display engine 520, which then uses the display content to generate controls for the visible laser diodes in laser module 504 and for the optical scanner 512. Laser module 508 generates visible light signals, which are directed to optical scanner 512. Optical scanner 512 deflects the visible light signals, and optical splitter 532 receives the deflected signals from optical scanner 512. Each facet of optical splitter 532 directs a subset of the visible light signals received by the optical splitter 532 to optical combiner 540, which redirects the subset of the visible light signals to a respective exit pupil proximate eye 200. The visible light signals enter eye 200, forming a virtual display in a target space in a field of view of eye 200. While scanning light projector 504 is projecting content to exit pupils at eye 200, the eye tracking system may be operated to track the gaze position of eye 200 relative to the target space. The eye tracking function includes projecting infrared light signals from M virtual light projectors created by optical splitter 132 to eye 200 and detecting reflections of infrared light signals from eye 200 by infrared detector 144. Edge detector 176 may detect glints from the output of infrared detector 144 and provide glint timing data to an eye tracking program (156 in FIG. 6) that is running on processor 128. The eye tracking program uses the glint timing data to determine a gaze position of the eye. The tracking program may also receive the detected reflections of the infrared light signals from infrared detector 144 and timing signals indicative of the positions of the optical scanner 112 from scan engine 120 (reflection-position data) or pupil timing data from edge detector 176, and use the reflection-position data (or pupil timing data) and glint timing data to recalibrate the eye tracking system. The reflection-position data (or pupil timing data) and glint timing data, collectively referred to as "eye tracking data", may be used for other purposes besides eye tracking. (Although not shown in FIG. 9, one or more infrared holograms with an optical function as previously described may be placed in the optical path between optical splitter 132 and optical combiner 140.)

FIG. 10 shows that the eye tracking system and display system can share a common projection path to reduce the number of components in the wearable heads-up display. In the example wearable heads-up display 600 of FIG. 10, the laser module 608 includes visible laser diodes to generate visible light, e.g., red laser diode (R), green laser diode (G), and blue laser diode (B), and infrared laser diode (IR) to generate infrared light. The visible light will be used for displaying content, and the infrared light will be used for eye tracking. Optical scanner 612 receives both visible and infrared light signals and deflects these signals to optical splitter 632. (Optical splitter 632 may have the same characteristics as described for optical splitter 132 in FIG. 1. Optical splitter 632 will need to be transparent to both infrared light and visible light.) Optical splitter 632 creates M virtual light projectors, where M>1. For content display, visible light signals from the M virtual light projectors are projected to M exit pupils proximate eye 200 to form a virtual display in a target space in a field of view of eye 200. Optical combiner 540 receives visible light signals from optical splitter 632 and directs the visible light signals to the M exit pupils. For eye tracking, infrared light from the M virtual light projectors are projected to eye 200 to form M illumination areas on eye 200. Optical combiner 140 receives infrared light signals from optical splitter 632 and directs the infrared light signals to eye 200 to form the M illumination areas. Optical combiners 140, 540 may be integrated with lens 510 to form an "optical combiner lens". Controls for the light sources in laser module 608 and controls for the scan element(s) in optical scanner 612 are provided by a display engine 620. Display engine 620 may be structurally similar to scan engine 120 (in FIG. 6), with the exception the laser diode driver (or laser driver in general) will now be responsible for driving laser module 608 that includes a combination of visible and infrared light sources. Processor 128 may provide a frame buffer to display engine 620 with display content. In order to accommodate eye tracking, each pixel of the buffer will have values for R, G, B, and IR. The visible laser diodes of laser module 608 will be controlled with R, G, and B values of the pixels, and the infrared laser diode of laser module 608 will be controlled with the IR value of the pixel. In general, eye tracking will occur simultaneously with content display. However, if it is desired to carry out eye tracking without content display, or vice versa, this can be achieved through turning off appropriate ones of the R, G, B, IR channels.

When the eye tracking system is integrated into a wearable heads-up display, the gaze position of the eye can be tracked and used for various purposes. One example is positioning content in the display space. Another example is exit pupil suppression. This applies to the case where the wearable heads-up display uses multiple exit pupils. For example, it is possible to identify multiple glints per scan period and determine a gaze position of the eye in the display space per scan period based on the multiple glints. As the glints are detected during a scan period, it is possible to predict the trajectory of the gaze of the eye based on changes in the position of the glints. Based on this prediction, it is possible to see which exit pupils the eye would be aligned with for the next frame of display. If there are four exit pupils, for example, and the eye is predicted to be aligned with just one of the four exit pupils for the next frame of display, then there may be no point in projecting content to all the four exit pupils. In this case, the three exit pupils that would not be aligned with the eye can be disabled for the next frame of display. Thus, the eye tracking program may predict the trajectory of the eye based on glints detected during a current scan period and indicate to the display system which exit pupil(s) should be enabled or disabled for the next frame of the display.

Figure 11:
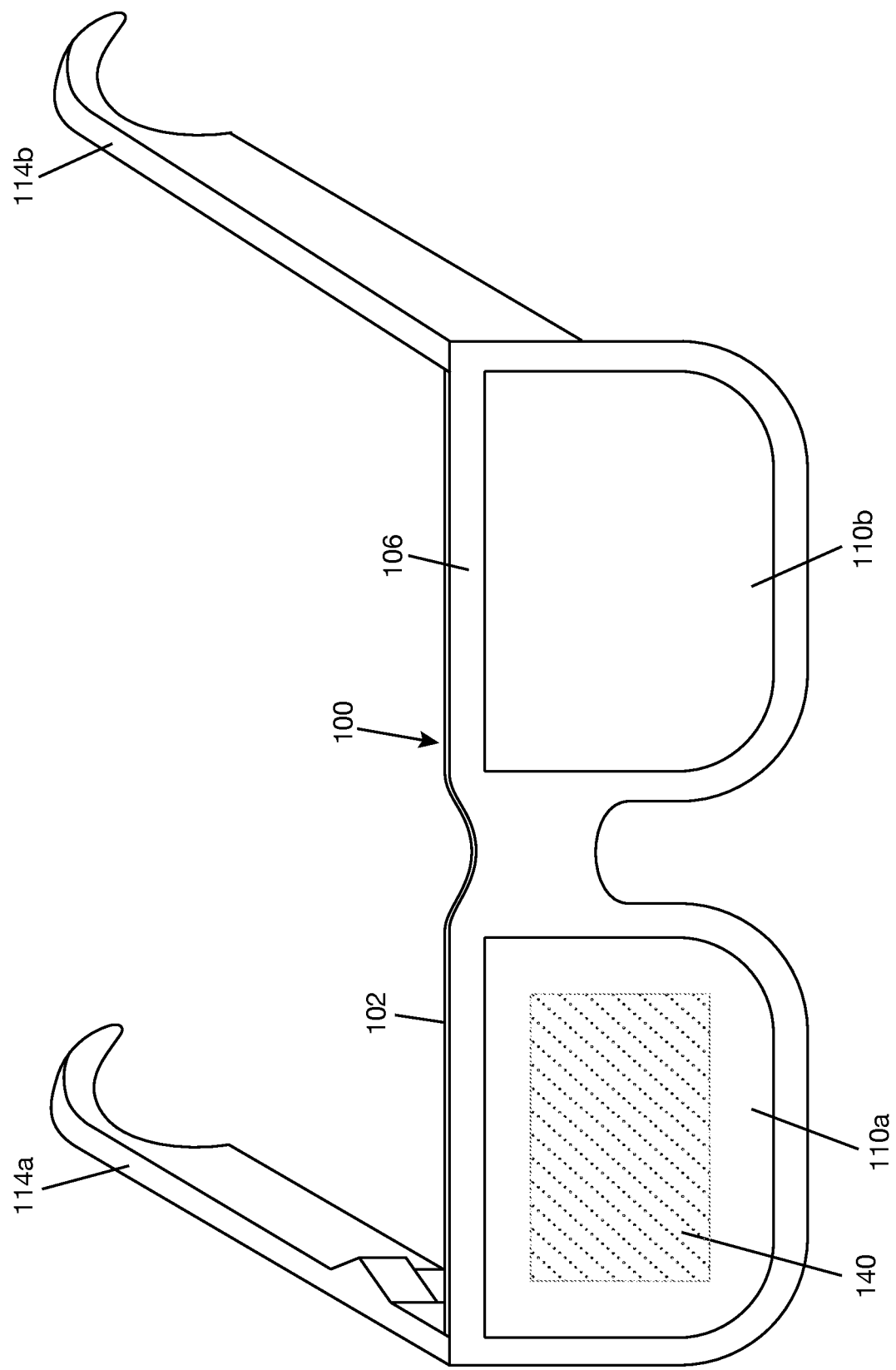
FIG. 11 is a perspective view of a near-eye wearable device that may embody an eye tracking system and/or a display system.

FIG. 11 shows a near-eye wearable device having the form of glasses (or eyeglasses). Near-eye wearable device may embody the eye tracking system or any of the wearable heads-up display systems incorporating the eye tracking system described above. The near-eye wearable device includes a support frame that carries the devices and electronics that enable eye tracking or both eye tracking and content display. In one example, support frame 102 includes a frame front 106 carrying a pair of lenses 110a, 110b and temples 114a, 114b attached to opposite sides of the frame front. Lens 110a may be an optical combiner lens including one or more optical combiners (e.g., 140 in FIGS. 1, 9, and 10; 540 in FIGS. 9 and 10) integrated in a lens. Lens 110a is in opposing relation to an eye of the user when the support frame 102 is worn on the head of the user. In this position, the eye tracking system or the wearable heads-up display system incorporating the eye tracking system can be operated to illuminate the eye through the one or more optical combiners. Other components of the eye tracking system or wearable heads-up display system may be carried in the temples 110a, 100b. In some examples where the near-eye display device embodies a wearable heads-up display system, the optical system of the display system may be carried in one of the temples and the optical system of the eye tracking system may be carried in the other temple. This is possible when the optical system of the eye tracking system is decoupled from the optical system of the display system as shown, for example, in FIGS. 9 and 10. This means that content is displayed to one eye, and gaze position of the other eye is tracked.

The foregoing detailed description has set forth various implementations or embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation or embodiment, the present subject matter may be implemented via Application Specific Integrated Circuits (ASICs). However, those skilled in the art will recognize that the implementations or embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this disclosure, a "non-transitory processor-readable medium" or "non-transitory computer-readable memory" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples of the processor-readable medium are a portable computer diskette (magnetic, compact flash card, secure digital, or the like), a random-access memory (RAM), a read-only memory (ROM), an erasable programmable read-only memory (EPROM, EEPROM, or Flash memory), a portable compact disc read-only memory (CDROM), digital tape, and other non-transitory medium.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. A method of tracking a gaze position of an eye in a target space in a field of view of the eye over an eye tracking period, the method comprising:
    performing a plurality of scans of the eye with infrared light within the eye tracking period, each scan comprising:
        generating infrared light signals over a scan period; and
        projecting the infrared light signals from a number M of virtual light projectors to the eye to form the number M of illumination areas on the eye, wherein the number M>1;
    detecting reflections of the infrared light signals from the eye for each scan; and
    determining the gaze position of the eye in the target space from the detected reflections of the infrared light signals for each scan, wherein determining the gaze position of the eye in the target space from the detected reflections of the infrared light signals for each scan comprises:
        identifying a plurality of glints from the detected reflections of the infrared light signals for the scan, and
        determining the gaze position relative to the target space based on the identified plurality of glints.

2. The method of claim 1, wherein projecting the infrared light signals from the number M of virtual light projectors to the eye to form the number M of illumination areas on the eye comprises directing the infrared light signals from a source of the infrared light signals to an optical scanner over the scan period while controlling the optical scanner through a range of scan positions to deflect each infrared light signal at a respective scan angle.

3. The method of claim 2, wherein projecting the infrared light signals from the number M of virtual light projectors to the eye further comprises receiving each infrared light signal deflected by the optical scanner at one of the number M of optical elements of an optical splitter, wherein during at least a portion of the scan period each of the number M of optical elements receives a subset of the infrared light signals and redirects each subset of the infrared light signals in a respective direction.

4. The method of claim 3, wherein projecting the infrared light signals from the number M of virtual light projectors to the eye further comprises receiving each subset of the infrared light signals redirected by each of the number M of optical elements at an optical combiner and redirecting each subset of the infrared light signals by the optical combiner to the eye, thereby forming the respective illumination area.

5. The method of claim 4, further comprising applying an optical function to at least a portion of the infrared light signals redirected by at least one of the number M of optical elements and received by the optical combiner.

6. The method of claim 5, wherein applying an optical function to at least a portion of the infrared light signals comprises applying a beam diverging function or a beam converging function to the at least a portion of the infrared light signals.

7. The method of claim 1, wherein determining the gaze position relative to the target space based on the glint center positions comprises:
    applying a mapping function that transforms coordinates from a scan space to the target space to each of the gaze positions to obtain a corresponding intermediate gaze position in the target space; and
    combining the intermediate gaze positions to obtain the gaze position in the target space for the scan.

8. The method of claim 7, further comprising at a select recalibration time during the eye tracking period, adjusting the mapping function to compensate for drifts in the scan space relative to the target space.

9. The method of claim 1, wherein detecting reflections of the infrared light signals from the eye for each scan comprises detecting reflections of each infrared light signal along at least two different paths.

10. A method of displaying content to an eye in a target space in a field of view of the eye, the method comprising:
> over a first period, projecting visible light to at least one exit pupil formed proximate the eye to form a virtual display in the target space; and
> over a second period overlapping with the first period, tracking a gaze position of the eye in the target space, the tracking comprising:
>> performing a plurality of scans of the eye with infrared light over the second period, each scan comprising (a) generating infrared light signals over a scan period and (b) projecting the infrared light signals from a number M of virtual light projectors to the eye to form the number M of illumination areas on the eye, wherein the number M>1;
>> detecting reflections of the infrared light signals from the eye for each scan; and
>> determining the gaze position of the eye in the target space from the detected reflections of the infrared light signals for each scan, wherein determining the gaze position of the eye in the target space from the detected reflections of the infrared light signals for each scan comprises:
>>> identifying a plurality of glints from the detected reflections of the infrared light signals for the scan; and
>>> determining the gaze position relative to the target space based on the identified plurality of glints; and
> selectively adjusting the virtual display in the target space based on the gaze position.

11. The method of claim 10, further comprising determining a trajectory of the gaze position of the eye from the detected reflections of the infrared light signals for each scan.

12. The method of claim 11, wherein a plurality of exit pupils are formed proximate the eye, and further comprising selectively enabling or disabling the exit pupils to receive a portion of the visible light based on the trajectory of the gaze position.

13. An eye tracking system, comprising:
> a scanning light projector including an infrared light source and at least one scan mirror, the scanning light projector to output infrared light signals according to a scan pattern;
> an optical splitter having a number M of optical elements, wherein the number M>1, each of the number M of optical elements to receive a subset of the infrared light signals outputted by the scanning light projector and create a virtual light projector for the subset of the infrared light signals;
> an optical combiner positioned and oriented to receive each subset of the infrared light signals from the corresponding virtual light projector and redirect the subset of the infrared light signals to a target to form an illumination area on the target, the optical combiner including at least one infrared hologram that is responsive to infrared light and unresponsive to other light; and
> an infrared detector positioned and oriented to detect reflections of the infrared light signals from the target;
> a processor that is communicatively coupled to the scanning light projector and the infrared detector; and
> a non-transitory processor-readable storage medium that is communicatively coupled to the processor, wherein the non-transitory processor-readable storage medium stores data and/or processor-executable instructions that, when executed by the processor, cause the eye tracking system to:
>> generate infrared light signals by the infrared light source over a scan period;
>> project the infrared light signals from the number M of virtual light projectors created by the optical splitter to an eye to form the number M of illumination areas on the eye;
>> detect reflections of the infrared light signals from the eye by the infrared detector for the scan period; and
>> determine a gaze position of the eye in a target space from the detected reflections of the infrared light signals for the scan period, wherein the gaze position of the eye in the target space is determined from the detected reflections of the infrared light signals for the scan period and comprises:
>>> identifying a plurality of glints from the detected reflections of the infrared light signals for the scan period; and
>>> determining the gaze position relative to the target space based on the identified plurality of glints.

14. The eye tracking system of claim 13, further comprising a second infrared hologram positioned between the optical splitter and the optical combiner to apply a select optical function to at least a fraction of the infrared light signals outputted by the optical splitter.

15. A method of tracking a gaze position of an eye in a target space in a field of view of the eye over an eye tracking period, the method comprising:
> performing a plurality of scans of the eye with infrared light within the eye tracking period, each scan comprising:
>> generating infrared light signals over a scan period; and
>> projecting the infrared light signals from a number M of virtual light projectors to the eye to form the number M of illumination areas on the eye, wherein the number M>1;
> detecting reflections of the infrared light signals from the eye for each scan; and
> determining the gaze position of the eye in the target space from the detected reflections of the infrared light signals for each scan,
> wherein determining the gaze position of the eye in the target space from the detected reflections of the infrared light signals for each scan comprises:
>> identifying a plurality of glints from the detected reflections of the infrared light signals for the scan, each glint associated with one of a plurality of scan subspaces;
>> determining a glint center position of each glint in a respective scan subspace; and
>> determining the gaze position relative to the target space based on the glint center positions.

16. The method of claim 15, wherein determining the gaze position relative to the target space based on the glint center positions comprises:
> applying mapping functions to the glint center positions to obtain corresponding intermediate gaze positions in the target space, wherein each of the mapping functions transforms coordinates from one of the scan subspaces to the target space; and
> combining the intermediate gaze positions to obtain the gaze position in the target space for the scan.

17. The method of claim 16, further comprising at a select recalibration time during the eye tracking period, adjusting each of the mapping functions to compensate for drift in the respective scan subspace relative to the target space.

18. A method of tracking a gaze position of an eye in a target space in a field of view of the eye over an eye tracking period, the method comprising:
performing a plurality of scans of the eye with infrared light within the eye tracking period, each scan comprising:
generating infrared light signals over a scan period; and
projecting the infrared light signals from a number M of virtual light projectors to the eye to form the number M of illumination areas on the eye, wherein the number M>1;
detecting reflections of the infrared light signals from the eye for each scan; and
determining the gaze position of the eye in the target space from the detected reflections of the infrared light signals for each scan, wherein determining the gaze position of the eye in the target space from the detected reflections of the infrared light signals for each scan comprises:
identifying a plurality of glints from the detected reflections of the infrared light signals for the scan, and
upon identifying each glint:
determining a glint center position of the glint relative to a scan space or a scan subspace; and
transforming the glint center position from the scan space or the scan subspace to the gaze position in the target space.

19. An eye tracking system, comprising:
a scanning light projector to project visible light over a first period to at least one exit pupil formed proximate an eye in a target space to form a virtual display in the target space, wherein the scanning light projector is further to generate infrared light over a second period overlapping the first period;
an optical splitter having a number M of optical elements forming M virtual light projectors, wherein the number M>1, each of the M virtual light projectors to project, over the second period for a plurality of scans of the eye, at least a portion of the infrared light to the eye to form the number M of illumination areas on the eye;
an infrared detector to detect reflections of the infrared light from the eye for each scan; and
a processor that is communicatively coupled to the scanning light projector and the infrared detector, the processor to
determine a gaze position of the eye in the target space from the detected reflections of the infrared light for each scan, wherein the processor is to determine the gaze position of the eye for each scan by:
identifying a plurality of glints from the detected reflections of the infrared light for the scan; and
determining the gaze position relative to the target space based on the identified plurality of glints,
wherein the processor is further to selectively adjust the virtual display in the target space based on the gaze position.

20. The eye tracking system of claim 19, wherein the processor is further to: determine a trajectory of the gaze position of the eye from the detected reflections of the infrared light for each scan.

21. The eye tracking system of claim 20, wherein a plurality of exit pupils are formed proximate the eye, and wherein the processor is further to:
selectively enable or disable the exit pupils to receive a portion of the visible light based on the trajectory of the gaze position.

22. An eye tracking system, comprising:
a scanning light projector to generate infrared light signals during a plurality of scan periods;
an optical splitter having a number M of optical elements forming M virtual light projectors, each of the M virtual light projectors to project, for each scan period, the infrared light signals to an eye in a target space to form the number M of illumination areas on the eye, wherein the number M>1;
an infrared detector to detect reflections of the infrared light signals from the eye for each scan; and
a processor that is communicatively coupled to the scanning light projector and the infrared detector, the processor to
determine a gaze position of the eye in the target space from the detected reflections of the infrared light signals for each scan, wherein the processor is to determine the gaze position of the eye for each scan by:
identifying a plurality of glints from the detected reflections of the infrared light signals for the scan, each glint associated with one of a plurality of scan subspaces; and
determine a glint center position of each glint in a respective scan subspace; and
determine the gaze position relative to the target space based on the glint center positions.

23. An eye tracking system, comprising:
a scanning light projector to generate infrared light signals during a plurality of scan periods;
an optical splitter having a number M of optical elements forming M virtual light projectors, each of the M virtual light projectors to project, for each scan period, the infrared light signals to an eye in a target space to form the number M of illumination areas on the eye, wherein the number M>1;
an infrared detector to detect reflections of the infrared light signals from the eye for each scan; and
a processor that is communicatively coupled to the scanning light projector and the infrared detector, the processor to
determine a gaze position of the eye in the target space from the detected reflections of the infrared light signals for each scan, wherein the processor is to determine the gaze position of the eye for each scan by:
identifying a plurality of glints from the detected reflections of the infrared light signals for the scan; and
upon identifying each glint:
determine a glint center position of the glint relative to a scan space or a scan subspace; and
transform the glint center position from the scan space or the scan subspace to the gaze position in the target space.

* * * * *